US011210657B2

(12) United States Patent
Joseph et al.

(10) Patent No.: US 11,210,657 B2
(45) Date of Patent: Dec. 28, 2021

(54) SYSTEM AND METHOD FOR MOBILE WALLET REMITTANCE

(71) Applicant: Samsung Electronics Co., Ltd, Suwon-si (KR)

(72) Inventors: Vinod Cherian Joseph, Fremont, CA (US); Tuomo Sipila, San Jose, CA (US); Homayoon Shahinfar, San Jose, CA (US); Kaushik Roy, Foster City, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 15/789,705

(22) Filed: Oct. 20, 2017

(65) Prior Publication Data

US 2018/0114216 A1 Apr. 26, 2018

Related U.S. Application Data

(60) Provisional application No. 62/410,824, filed on Oct. 20, 2016.

(51) Int. Cl.
G06Q 20/36 (2012.01)
G06Q 20/10 (2012.01)
G06Q 40/04 (2012.01)
G06N 3/08 (2006.01)
G06Q 20/32 (2012.01)
G06Q 20/40 (2012.01)

(52) U.S. Cl.
CPC ............ *G06Q 20/36* (2013.01); *G06N 3/08* (2013.01); *G06Q 20/10* (2013.01); *G06Q 20/3223* (2013.01); *G06Q 20/4016* (2013.01); *G06Q 20/40145* (2013.01); *G06Q 40/04* (2013.01)

(58) Field of Classification Search
CPC .............................. G06Q 20/36; G06Q 20/10
See application file for complete search history.

(56) References Cited

U.S. PATENT DOCUMENTS 8,589,288 B1 11/2013 Meyer et al.
2002/0194119 A1 12/2002 Wright et al.
(Continued)

FOREIGN PATENT DOCUMENTS

JP 2017068541 A 4/2017
KR 20100134965 A * 12/2010
KR 101722017 B1 3/2017

OTHER PUBLICATIONS

Merriam-Webster, Definition of be, Jan. 7, 2020, p. 2 (Year: 2020).*
(Continued)

*Primary Examiner* — Hani M Kazimi
*Assistant Examiner* — Adam Hilmantel

(57) ABSTRACT

A method, electronic device, and non-transitory computer readable medium for a mobile wallet remittance are provided. The method includes receiving a request to remit money from a sender to a receiver, wherein the request includes transaction information. The method also includes generating a list of eligible providers from a plurality of providers based on the transaction information. Additionally, the method includes notifying a provider to transfer the money when an indication is received that a provider is selected from the list of eligible providers.

20 Claims, 13 Drawing Sheets

(56) References Cited

U.S. PATENT DOCUMENTS

| | | | |
|---|---|---|---|
| 2005/0004872 A1 | 1/2005 | Gavin et al. | |
| 2006/0287953 A1* | 12/2006 | Chauhan | G06Q 20/10 |
| | | | 705/39 |
| 2007/0282739 A1 | 12/2007 | Thomsen | |
| 2008/0021822 A1* | 1/2008 | Hinton | G06Q 10/10 |
| | | | 705/40 |
| 2011/0258115 A1 | 10/2011 | Mulhim | |
| 2011/0276476 A1 | 11/2011 | Kim | |
| 2014/0143147 A1* | 5/2014 | Poornachandran | G06Q 40/02 |
| | | | 705/44 |
| 2014/0172695 A1* | 6/2014 | Kanjlia | G06Q 30/02 |
| | | | 705/39 |
| 2014/0358634 A1* | 12/2014 | Schnabl | G06Q 10/063 |
| | | | 705/7.31 |
| 2015/0302367 A1* | 10/2015 | Billou | G06Q 20/227 |
| | | | 705/39 |
| 2015/0317729 A1 | 11/2015 | Rivet et al. | |
| 2016/0203575 A1* | 7/2016 | Madhu | H04L 67/22 |
| | | | 705/319 |
| 2016/0239831 A1* | 8/2016 | Saunders | G06Q 20/10 |
| 2016/0343096 A1* | 11/2016 | Kruglick | G06Q 50/14 |
| 2017/0098216 A1* | 4/2017 | Studnitzer | G06Q 20/4014 |
| 2017/0200137 A1* | 7/2017 | Vilmont | G06Q 30/0213 |

OTHER PUBLICATIONS

Thesaurus.com, Describe Synonyms, Jan. 7, 2020, pp. 1-2 (Year: 2020).*

Mampaey, "Secure Remittance Transaction to Bankless Consumers in a Fragmented Applications Market", Sep. 2011, Nokia Bell Labs, vol. 16 Issue: 2, pp. 219-233 (Year: 2011).*

International Search Report and Written Opinion regarding International Application No. PCT/KR2017/011696, dated Jan. 29, 2018, 9 pages.

* cited by examiner

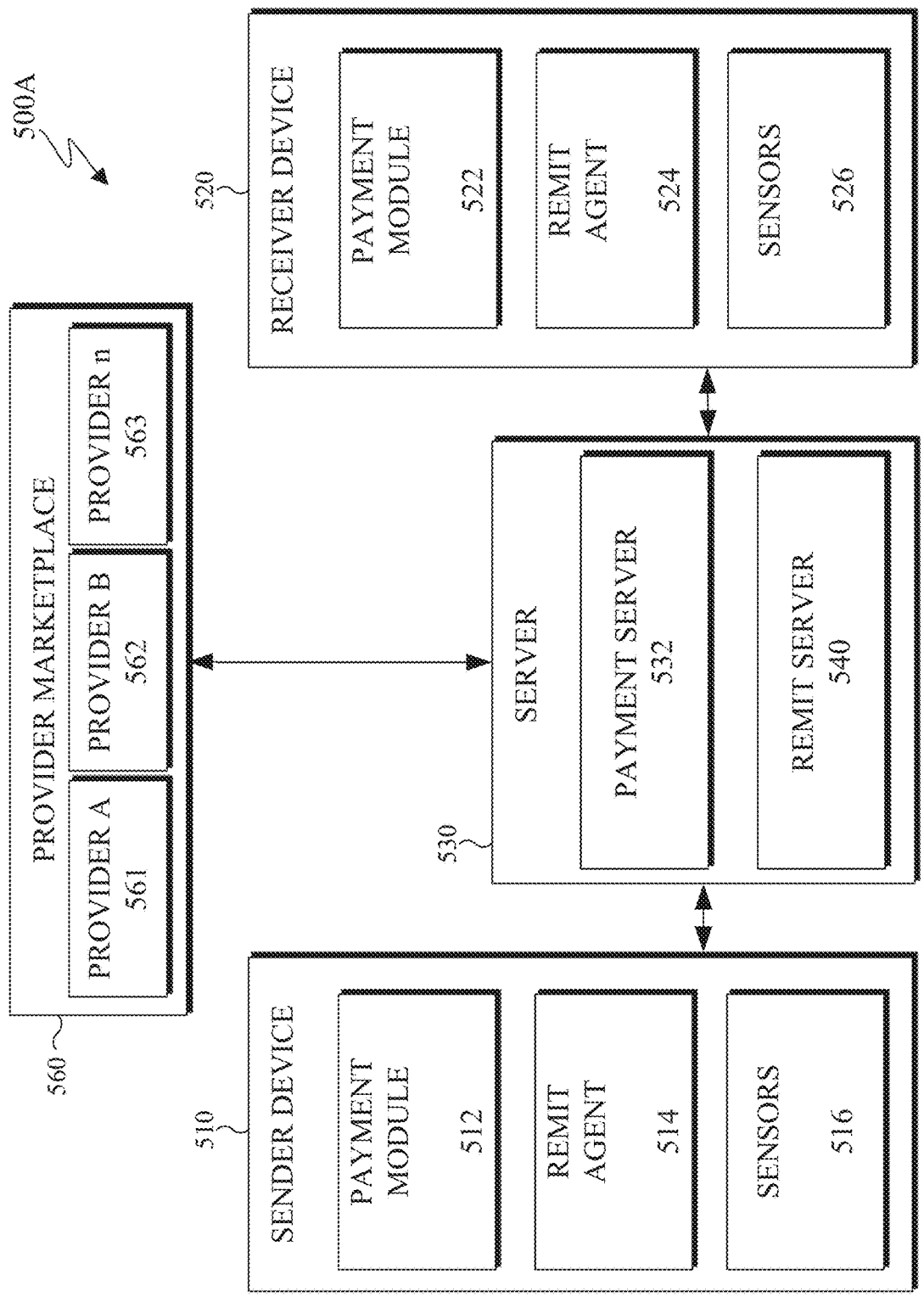

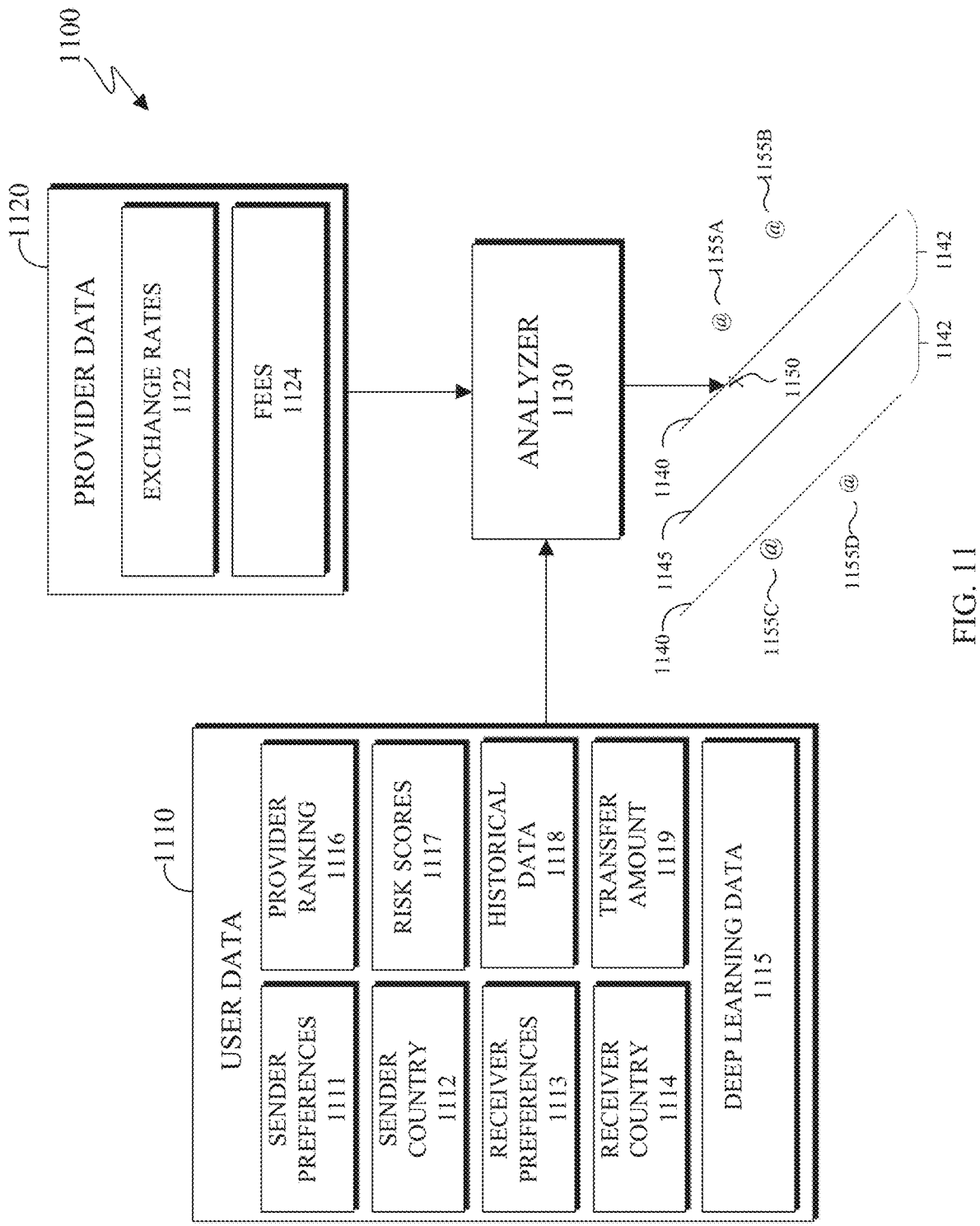

SYSTEM AND METHOD FOR MOBILE WALLET REMITTANCE

CROSS-REFERENCE TO RELATED APPLICATION AND CLAIM OF PRIORITY

This application claims priority under 35 U.S.C. § 119(e) to U.S. Provisional Patent Application No. 62/410,824 filed on Oct. 20, 2016 and entitled "SYSTEM AND METHOD FOR MOBILE WALLET REMITTANCE." The above-identified provisional patent application is hereby incorporated by reference in its entirety.

TECHNICAL FIELD

This disclosure relates generally to remittance transactions. More specifically, this disclosure relates to management and administering remittance in a mobile commerce environment as well as managing a marketplace of providers.

BACKGROUND

Throughout history people moved to improve their work prospects. Due to the ease of travel coupled with today's global marketplace, this has never been easier. Due to the millions of persons currently working abroad, the remittance industry, of banks and financial instructions worldwide has greatly increased. Remittance generally refers to the act of transferring money to a distant or foreign receiver. For example, remittance is often a money transfer made by an individual in one country to an individual in a different country. Remittance is generally operated under a financial regulation and performed via banks and clearinghouses. For example, a user generally must go to a bank branch and deal with an agent directly, pay the requested transfer fees, and often incurs a delay before a receiver receives in the money transfer. Due to the multiple parties involved, different regulations that govern each country, and the delay in the delivery of the funds, remittance can be cumbersome for many users.

Payment platforms are becoming more widespread with the advent of mobile banking servers. Such services generally allow a user to make payments for purchasing goods and services using a compatible device via a wireless transmission of payment information. Mobile payment platforms are slow to enter the realm of global remittance due to financial regulations, security issues, and poor banking networks, to name a few.

SUMMARY

This disclosure provides embodiments of systems and methods for mobile wallet remittance.

In a first embodiment, a method for mobile wallet remittance is provided. The method includes receiving request to remit money from a sender to a receiver, wherein the request includes transaction information. The method also generates a list of eligible providers from a plurality of providers based on the transaction information. The method further includes notifying a provider to transfer the money when an indication is received that a provider is selected from the list of eligible providers.

In a second embodiment, an electronic device is provided. The at least one processor is coupled to a communication interface and a memory and configured to receive request to remit money from a sender to a receiver, wherein the request includes transaction information. The least one processor is also configured to generate a list of eligible providers from a plurality of providers based on the negotiated remittance information. The least one processor is also configured to notify a provider to transfer the money when an indication is received that a provider is selected from the list of eligible providers.

In a third embodiment a non-transitory computer readable medium embodying a computer program is provided. The computer program includes program code that when executed causes at least one processor to receive request to remit money from a sender to a receiver, wherein the request includes transaction information; generate a list of eligible providers from a plurality of providers based on the negotiated remittance information; and notify a provider to transfer the money when an indication is received that a provider is selected from the list of eligible providers.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A and 5B illustrate an example block diagram in accordance with an embodiment of this disclosure;

FIG. 11 illustrates an example block diagram of selecting a provider, in accordance with an embodiment of this disclosure.

DETAILED DESCRIPTION

Figure 1:
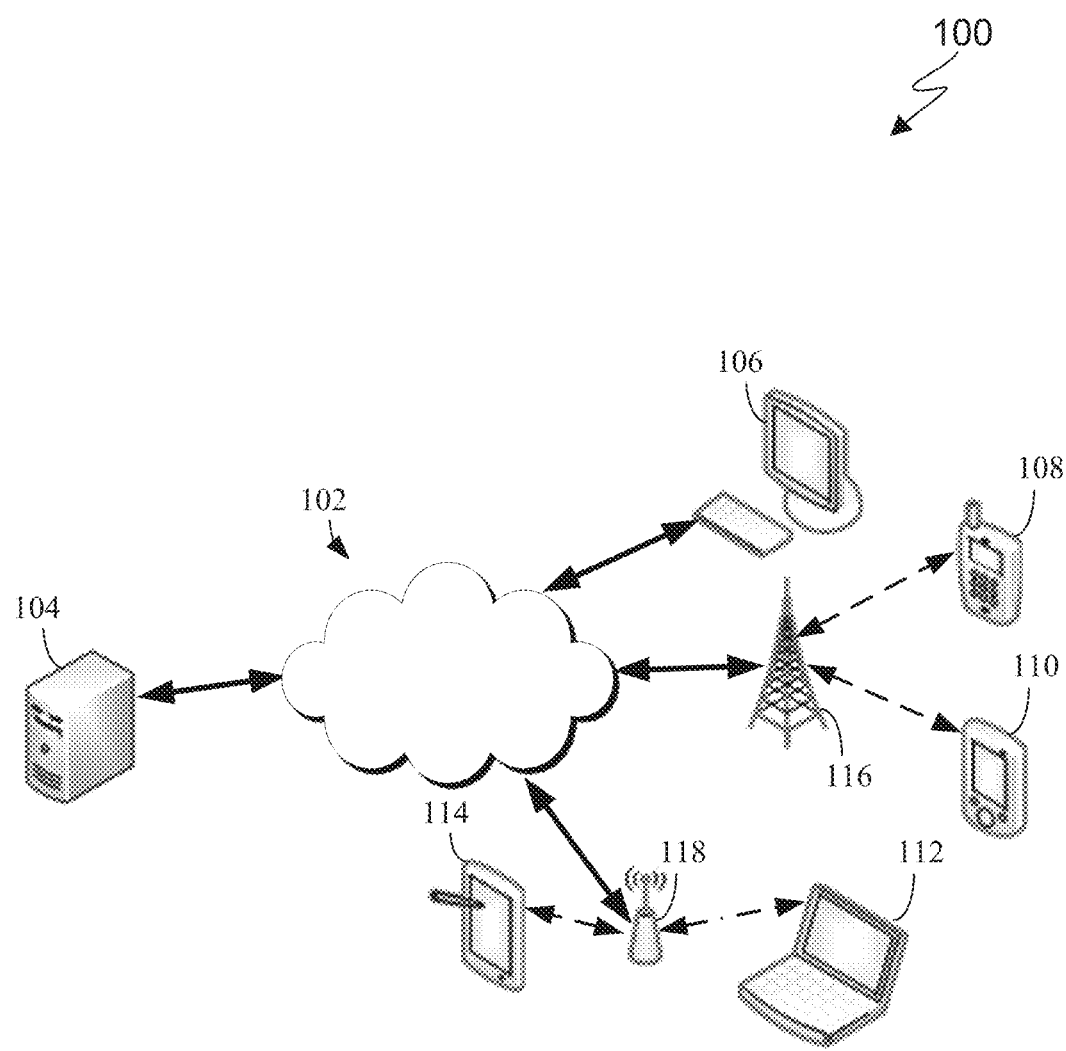
FIG. 1 illustrates an example communication system in accordance with embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably-arranged wireless communication system or device.

According to embodiments of the present disclosure, remittance transactions typically involve a transfer of money from one location to another. Both the individual who sends the money (hereinafter, the "sender") to a foreign location, and the individual who receives the money (hereinafter, the "receiver"), typically must go through a series of steps, where each step requires decisions that can impact the service provided, and fees associated with the remittance.

Generally, in a typical remittance transaction, the sender engages a service provider to facilitate the transaction with receiver. In exchange, the service provider typically charges the sender or receiver or both parties, a transaction fee. The service provider also typically indicates an exchange rate. The process additionally includes a delay in the transfer of funds. The fees, exchange rates and the speed at which the funds are transfer from the sender to the receiver can vary from provider to provider and through the course of a day.

For example, a sender who desires to remit money from Country A to a receiver located in Country B, will first go to an agent of Bank A located within Country A. The sender gives the agent of Bank A the monetary value to be transferred, in addition to transaction fees, and information including data of the sender and the receiver. The agent of Bank A inputs the information into a system and provides the sender with a unique transaction identifier to be provided to the receiver. The agent of Bank A also notifies the sender with any foreign transaction fees and currency transfer fees as well as the time required to transfer the funds, some of which could be presented as options that could affect one or more aspects of the remittance. The sender then notifies the receiver, of the unique transaction identifier, as well as when the funds will be available at a specific bank, for example Bank B, located within country B. After the transfer delay period, the receiver goes to an agent of Bank B with the unique transaction identifier, received from the sender, and at least one form of identification. An agent of Bank B then verifies the identity of the receiver, and inputs the unique transaction identifier into the system. The system will notify the agent of Bank B if the unique transaction identifier is approved. Once approved, the agent of Bank B transfers the funds to Bank B, and then provides the receiver the monetary funds in the currency of Country B. A money transfer operator (hereinafter "provider") performs the transfer of funds from Bank A to Bank B. The provider is associated with Bank A and Bank B as well as a clearinghouse. The clearinghouse is a financial institution that facilitates the exchange of payments between financial institutions, such as Bank A and Bank B. In certain embodiment, the clearinghouse and the provider are the same entity.

Remittance can be a tedious and time consuming multi-step process for an individual or an entity to transfer money. Transaction delays between Bank A, Bank B, and the provider often occur. For example, in some instances, a week can pass prior to the receiver to receiving the money. The above process requires both the sender and the receiver to go to a bank or a provider directly to send and receive the money, respectively. The above process also requires both the sender and the receiver to communicate via a secure medium in order to exchange the unique transaction identifier. Additionally, fees associated with remittance can vary drastically, causing difficulty for the sender or receiver or both to compare fees. To determine a transaction fee for executing a particular currency remittance transaction, a provider takes into account a number of variables related to the transaction.

For example, fees can vary drastically throughout a single day based on a variety of factors, including but not limited to (i) the time and date of the request to send and receive the money, (ii) the specific banks used to transfer and receive the money, (iii) the proximity the sender is to the receiver, (iv) economic markets in each country, (v) the amount of money to be transfer, (vi) the currency exchange rates, (vii) the time period to deliver the funds, (viii) the nature of the parties involved (for example individuals, or businesses), and (ix) the relationship the provider has with the bank of the sender and the bank of the receiver. Different providers weigh these and other variables differently. As a result, fees for executing a particular remittance transaction vary considerably between providers.

According to embodiments of the present disclosure, mobile remittance is the process of remitting money from a sender in country A to a receiver in country B directly through an electronic device, without the need to go to a bank. Embodiments of the present disclosure provide a simple and transparent process for a sender to remit money to a receiver. For example, embodiments of the present disclosure allow for a user to compare fees between providers and select a particular provider to transfer the money, through a marketplace of providers. In certain embodiments, artificial intelligence or deep learning mechanisms, or a combination thereof is used to select a quantity of providers that match criteria of the user. Such criteria could include fees, delivery time, preferred vendors, and the like. For example, artificial intelligence and deep learning mechanisms can be implemented as options, during the mobile remittance process. Embodiments of the present disclosure can also rank the providers based on preset criteria.

Embodiments of the present disclosure also allow for near instantaneous or instantaneous delivery of the money directly to the receiver. In certain embodiments, the transfer of money is processed in near real time, independent of how the transfer is processed. For example, a near real time payment can involve a remittance provider to take an allocating and clearing the transfer afterwards. Embodiments of the present disclosure also provide a thorough fraud analysis to prevent fraud. Embodiments of the present disclosure also provide a cash card associated with an electronic device that can send and receive money transferred via remittance transaction. For example, the cash card can be a virtual card. Embodiments of the present disclosure also allow a sender or a receiver to link a bank account to the electronic device to send and receive money transferred via remittance transaction. Embodiments of the present disclosure also allow a sender or a receiver to utilize a cash delivery service to send and receive money transferred via remittance transaction.

Embodiments of the present disclosure further include within the scope of the disclosure that mobile remittance as used herein is not limited to a personal use; rather such implementation can be incorporated and used in a variety of locations and industries, such as in as commerce, industry, charity, government, and the like. Such transactions can occur, for example, between businesses, financial institutions, individuals, merchants, and combinations thereof.

Embodiments of the present disclosure provide for situations in which different variations of remittance are possible. Those skilled in the art will appreciate that embodiments of the present disclosure can be practiced without some specific details described below, and indeed will see that many other variations and embodiments can be practiced.

FIG. 1 illustrates an example system 100 according to this disclosure. The embodiment of the system 100 shown in FIG. 1 is for illustration only. Other embodiments of the system 100 could be used without departing from the scope of this disclosure.

As shown in FIG. 1, system 100 includes network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between various server(s) 104 and various client devices 106-114. Server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or mobile devices 108 (such as a smartphone), a personal digital assistant (PDA) 110, a laptop computer 112, and a tablet computer 114. However, any other or additional client devices could be used in the system 100.

In this example, some client devices 108-114 communicate indirectly with the network 102. For example, the client devices 108 and 110 (mobile devices 108 and PDA 110, respectively) communicate via one or more base stations 116, such as cellular base stations or eNodeBs. Also, the client devices 112 and 114 (laptop computer and table computer, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In certain embodiments the mobile device 108 (or any other client device 106-114) can transmit information securely and efficiently to another device, such as, for example, the server 104. The mobile device 108 (or any other client device 106-114) can track its location geographically, and identify the user to minimize or prevent fraud. The mobile device 108 (or any other client device 106-114) can trigger the information transmission between itself and server 104. The mobile device 108 (or any other client device 106-114) can provide a real-time user-friendly remittance method. Transmissions, in the form of money transfers, can be in the form of communication between the two client devices, such as two mobile devices 108, or between any two client devices, such as client devices 106-114, and server 104.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow remittance when one or more providers are supported on a device through a mobile wallet program or application. A provider represents a money transfer operator such as MONEYGRAM, WESTERN UNION, and the like. The processes and systems provided in this disclosure can provide a list of providers allowing a user to select a provider based on delivery times and fees associated with the remittance. The processes and systems in this disclosure can select a provider in real time, without user input based on the minimizing fees associated with the remittance. Additionally, the processes and systems provided in this disclosure allow for near instantaneous delivery of remitted money to a receiver in a foreign country. The processes and systems provided in this disclosure also allow the remittance to be executed directly through a sender mobile device and a receiver mobile device, thereby enabling a situation in which neither party is required to go a bank, as the sending and receiving of money is performed directly through the mobile device. For example, if the sender or the receiver, or both, have a virtual card associated with their mobile device, the money can be remitted directly to and from the virtual card. In certain embodiments, the virtual card is created during the remittance process. For example, if the receiver does not have a virtual card, a card is generated when money is delivered to the receiver. In certain embodiments the sender can remit money to a receiver from either a virtual card or from a linked bank account. The virtual card can, be for example, a debit card, a money card, a credit card, associated with a bank account and the like. For example, if a sender uses a virtual card, the money can originate from a bank account, a debit card, or a credit card in order to fund the transaction. Additionally, the processes and systems provided in this disclosure can provide fraud detection to prevent unauthorized transfer or receipt of remitted money.

Figure 2:
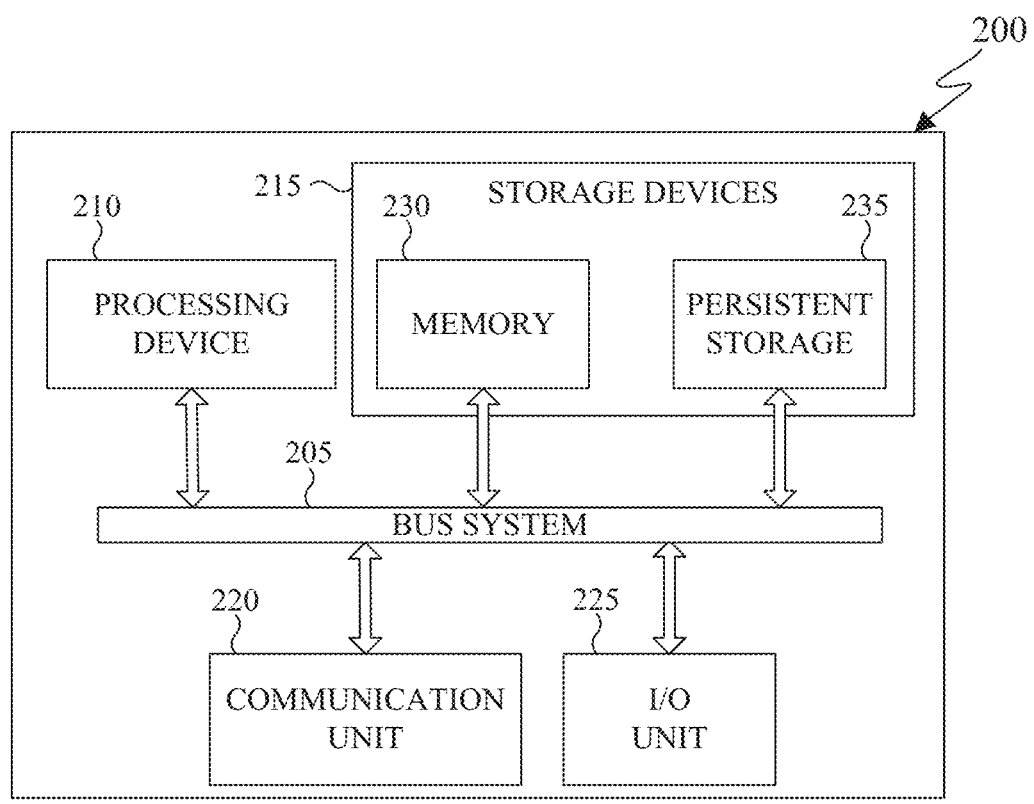
FIG. 2 illustrates an example electronic server in accordance with an embodiment of this disclosure.
Figure 3:
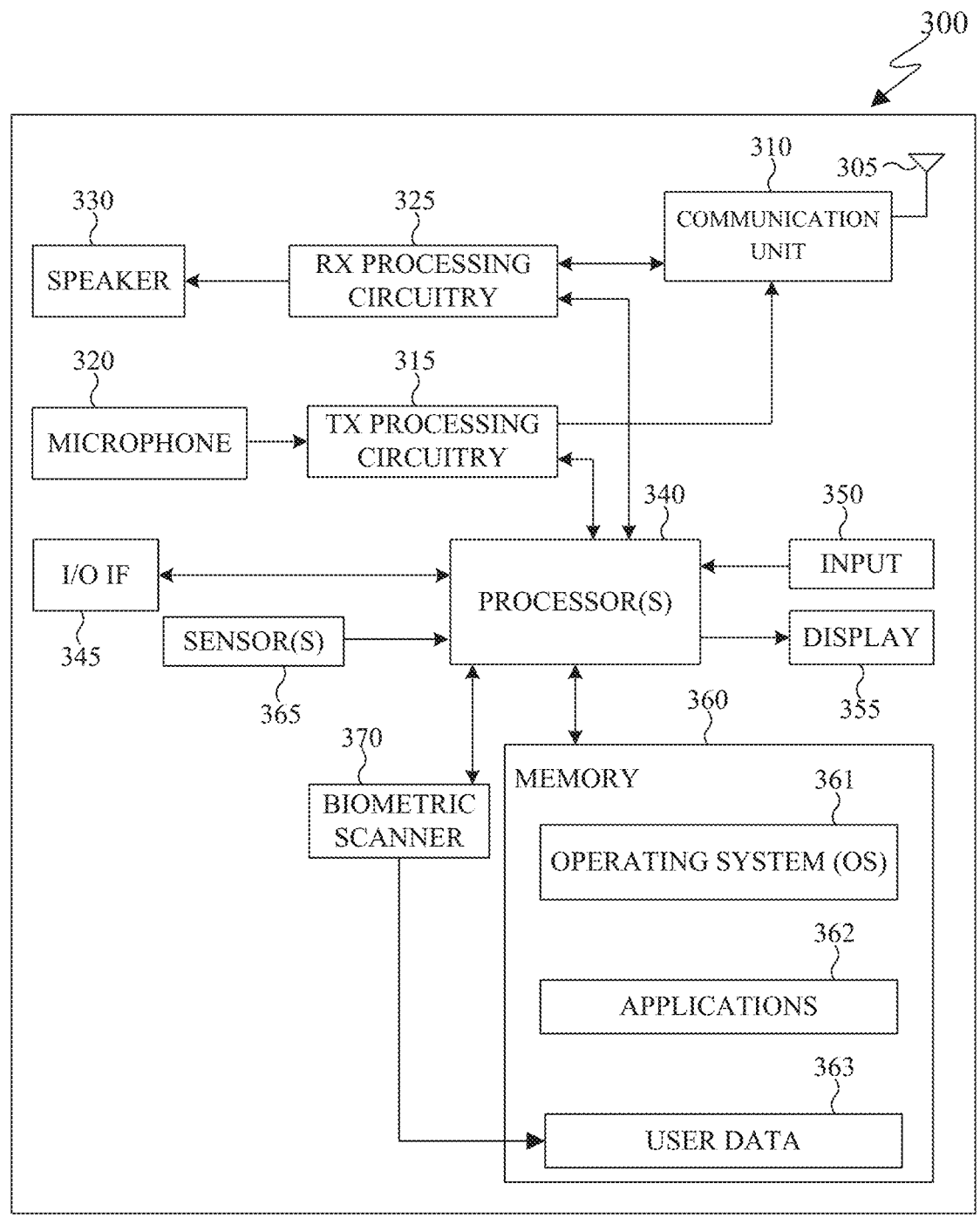
FIG. 3 illustrates an example electronic device in accordance with an embodiment of this disclosure.

FIGS. 2 and 3 illustrate example devices in a computing system in accordance with an embodiment of this disclosure. In particular, FIG. 2 illustrates an example server 200, and FIG. 3 illustrates an example electronic device 300. The server 200 could represent the server 104 in FIG. 1, and the electronic device 300 could represent one or more of the client devices 106-114 in FIG. 1.

Server 200 can represent one or more local servers, one or more payment analytics server, one or more remit servers, or one or more destination server to implement a mobile wallet remittance between one or more of the various client devices 106-114.

As shown in FIG. 2, the server 200 includes a bus system 205 that supports communication between at least one processing device 210, at least one storage device(s) 215, at least one communications unit 220, and at least one input/output (I/O) unit 225.

The processing device 210 executes instructions that can be stored in a memory 230. The processing device 210 can include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

FIG. 3 illustrates an electronic device 300 in accordance with an embodiment of this disclosure. The embodiment of the electronic device 300 shown in FIG. 3 is for illustration only and other embodiments could be used without departing from the scope of this disclosure. The electronic device 300 can come in a wide variety of configurations, and FIG. 3 does not limit the scope of this disclosure to any particular implementation of an electronic device. In certain embodiments, one or more of the devices 104-114 of FIG. 1 can include the same or similar configuration as electronic device 300.

In certain embodiments, electronic device 300 is useable with data transfer applications, such as mobile remittance. The electronic device 300 can be a mobile communication device, such as, for example, a mobile station, a head-mountable display, a subscriber station, a wireless terminal, a desktop computer (similar to desktop computer 106 of FIG. 1), a smart phone, a mobile device (similar to mobile device 108 of FIG. 1) a tablet (similar to tablet computer 114 of FIG. 1), and the like.

As shown in FIG. 3, the electronic device 300 includes an antenna 305, a communication unit 310, a transmit (TX) processing circuitry 315, a microphone 320, and a receive (RX) processing circuitry 325. The communication unit 310 can include, for example, a RF transceiver, a BLUETOOTH transceiver, a WI-FI transceiver, ZIGBEE, infrared, and the like. The electronic device 300 also includes a speaker 330, a processor 340, an input/output (I/O) interface 345, an input 350, a display 355, a memory 360, a sensor(s) 365, and a biometric scanner 370. The memory 360 includes an operating system (OS) 361 and one or more applications 362.

The communication unit 310 receives, from the antenna 305, an incoming RF signal transmitted such as a BLUETOOTH or WI-FI signal from an access point (such as a base station, Wi-Fi router, Bluetooth device) of the network 102 (such as a Wi-Fi, Bluetooth, cellular, 5G, LTE, LTE-A, WiMAX, or any other type of wireless network). The communication unit 310 can down-convert the incoming RF signal to generate an intermediate frequency or baseband signal. The intermediate frequency or baseband signal is sent to the RX processing circuitry 325 that generates a processed baseband signal by filtering, decoding, or digitizing the baseband or intermediate frequency signal, or a combination thereof. The RX processing circuitry 325 transmits the processed baseband signal to the speaker 330 (such as for voice data) or to the processor 340 for further processing (such as for web browsing data and remittance).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, digitizes, or a combination thereof, the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 is also capable of executing other applications 362 resident in the memory 360, such as, one or more applications for remittance, fraud detection, and the like.

The processor 340 can execute instructions that are stored in a memory 360. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discreet circuitry The processor 340 is also capable of executing other processes and programs resident in the memory 360, such as operations that receive, store, and timely instruct by providing image capturing and processing. The processor 340 can move data into or out of the memory 360 as required by an executing process. In some embodiments, the processor 340 is configured to execute plurality of applications 362 based on the OS 361 or in response to signals received from eNBs or an operator. The processor 340 is also coupled to the I/O interface 345 that provides the electronic device 300 with the ability to connect to other devices, such as client devices 104-116. The I/O interface 345 is the communication path between these accessories and the processor 340.

The processor 340 is also coupled to the input 350 and the display 355. The operator of the electronic device 300 can use the input 350 to enter data or inputs into the electronic device 300. Input 350 can be a keyboard, touch screen, mouse, track ball, voice input, or other device capable of acting as a user interface to allow a user in interact with electronic device 300. For example, the input 350 can include voice recognition processing thereby allowing a user to input a voice command. For another example, the input 350 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. Input 350 can be associated with sensor(s) 365 and/or a camera by providing additional input to processor 340. In certain embodiments, sensor 365 includes inertial sensors (such as, accelerometers, gyroscope, and magnetometer), optical sensors, motion sensors, cameras, pressure sensors, heart rate sensors, altimeter, breath sensors (such as microphone 320), and the like. The input 350 can also include a control circuit. In the capacitive scheme, the input 350 can recognize touch or proximity. The display 355 can be a liquid crystal display (LCD), light-emitting diode (LED) display, optical LED (OLED), active matrix OLED (AMOLED), or other display capable of rendering text and/or graphics, such as from websites, videos, games, images, and the like.

The memory 360 is coupled to the processor 340. Part of the memory 360 could include a random access memory (RAM), and another part of the memory 360 could include a Flash memory or other read-only memory (ROM).

The memory 360 can include persistent storage (not shown) that represents any structure(s) capable of storing and facilitating retrieval of information (such as data, program code, and/or other suitable information on a temporary or permanent basis). The memory 360 can contain one or more components or devices supporting longer-term storage of data, such as a ready only memory, hard drive, Flash memory, or optical disc. The memory 360 also can contain user data 363 received from one or more image capturing devices (such as sensor 365). User data 363 can biographical and biometric data. User data 363 can also include banking data and bank account information associated with a user.

Electronic device 300 further includes one or more sensor(s) 365 that can meter a physical quantity or detect an activation state of the electronic device 300 and convert metered or detected information into an electrical signal. For example, sensor 365 can include one or more buttons for touch input, (such as on a headset or the electronic device 300), a camera, a gesture sensor, a gyroscope or gyro sensor, an air pressure sensor, a magnetic sensor or magnetometer, an acceleration sensor or accelerometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, and the like. The sensor 365 can further include a control circuit for controlling at least one of the sensors included therein. The sensor(s) 365 can be used to determine an orientation and facing direction, as well as geographic location of the electronic device 300. Any of these sensor(s) 365 can be located within the electronic device 300, within a headset configured to hold the electronic device 300, or in both the headset and electronic device 300, for example, in embodiments where the electronic device 300 includes a headset.

Biometric scanner 370 represents one or more security devices able to capture identifying information about the user of electronic device 300. Biometric scanner 370 can capture identifying information of a person based on physiological or behavioral characteristics. These characteristics include fingerprints, facial images, iris prints, voice recognition, gait, identifiable methods the user performs a particular action (such as how the user removes electronic device 300 from its place of storage—a pant pocket or a purse). Example biometric data captured and analyzed by biometric scanner 370 can include but not limited to visual, behavioral, olfactory, auditory, and chemical biometric data. Visual biometric data analysis analyzes visual features of the user, such as iris recognition, facial recognition, and fingerprint recognition. Behavioral biometric analysis analyzes the walking ability and various characteristics that are distinct to every human. Olfactory biometric analysis analyzes odor to distinguish between different individuals. Auditory biometric analysis analyzes a voice input to determine the identity of a speaker. Chemical biometric analysis analyzes biological and chemical components that unique to each individual user, such as deoxyribonucleic acid (DNA).

Although FIGS. 2 and 3 illustrate examples of devices in a computing system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

Figure 4:
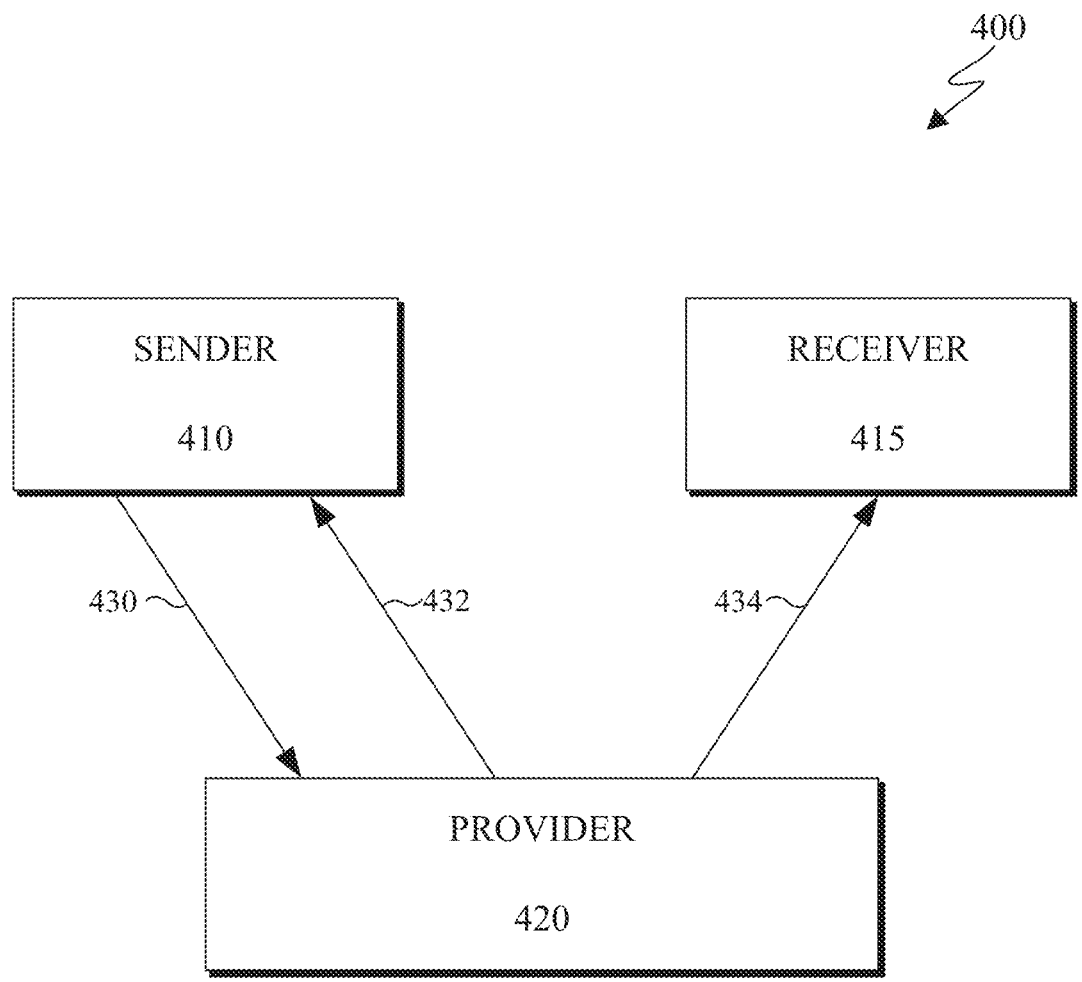
FIG. 4 illustrates an example block diagram of a money transfer environment in accordance with an embodiment of this disclosure.

FIG. 4 illustrates an example block diagram of a money transfer environment in accordance with an embodiment of this disclosure. The embodiment of the environment 400 shown in FIG. 4 is for illustration only. Other embodiments could be used without departing from the scope of the present disclosure.

Environment 400 illustrates a high-level overview of an embodiment of the present disclosure to remit money from a sender 410 to a receiver 415. The transaction can occur over a period of minutes rather than a period of days. Additionally, fees and costs are minimized. In the environment 400, sender 410 remits money to receiver 415. In certain embodiments, sender 410 and receiver 415 are located in the different countries. Sender 410 accesses an application, such as application 362, to remit funds via the electronic device 300 of FIG. 3. Application 362 can identify and authenticate the sender 410 via biometric scanner 370 or an input, such as a personal identification number (PIN) or password, through input 350. Thereafter, sender 410 can enter an amount of money to transfer, the designated recipient (receiver 415) of the money. In certain embodiments, application 362 suggests a specific provider to use (such as provider 420). In certain embodiments, sender 410 selects a specific provider to use (such as provider 420). Sender 410 also provides one or more forms of authentication such as biographical data and biometric data. Biographical data can include for example, a security phrase, a PIN, mother's maiden name of sender 410, a current or previous address where sender 410 resides, or any suitable personal identifiable information (PII). Thereafter, sender 410 confirms the transaction.

The information input by sender 410 is communicated 430 to the selected provider, namely provider 420. Provider 420 obtains the money from a mobile payment application associated with the remittance application, in real time, such as application 362. Examples of some mobile payment platforms can be based on services such as SAMSUNG PAY, ANDROID PAY, APPLE PAY, and the like. For example, application 362 can be associated with a mobile wallet service that contains a virtual debit, money card, or linked to a bank account. Money is transferred from the virtual card directly associated with the sender 410 to the provider 420.

If the transfer of funds to the provider is unsuccessful, provider 420 notifies 432 sender 410 regarding the failed attempt. Provider 420 can deny the transaction for a variety of reasons including, but not limited to insufficient funds on the sender's 410 virtual card. If the transfer of funds to the provider is successful, provider 420 transmits 432 a unique transaction identifier to electronic device 300 of sender 410. Application 362 also can transmit, independently or through a messaging service, the unique transaction identifier to the electronic device 300 of receiver 415. Once receiver 415 receives the unique transaction identifier, the provider 420 confirms 434 the unique transaction identifier to the receiver 415. It is noted that transmission 432 from provider 420 to sender 410 and confirmation 434 from provider 420 to receiver 415 can occur concurrently or near simultaneously. Thereafter provider 420 transfers the money to receiver 415. The money can be transferred to a virtual card (such as a debit or money card) located on the electronic device of the receiver 415 via the receiver's 415 mobile wallet service. The money can also be transferred to a bank account, a cash teller machine, such as an automated teller machine (ATM), or delivered to the receiver via a courier service.

It is noted that, in money transfer environment 400, both sender 410 and receiver 415 each have a respective electronic device, as further detailed with respect to FIGS. 5A and 5B below. In certain embodiments, both sender 410 and receiver 415 are previously registered to the application 362. In certain embodiments registration occurs for the sender 410 or receiver 415 during their first transaction. In certain embodiments receiver 415 does not register when the transaction is initiated, as the receiver can register at a later time. For example, the receiver 415 can receive the transaction notification via a phone number or an email address or the like, and perform the registration process later in order to receive the transferred monetary funds. User registration process and a user authenticated and fraud detection are discussed in more detail below with respect to FIG. 9.

Figure 5B:
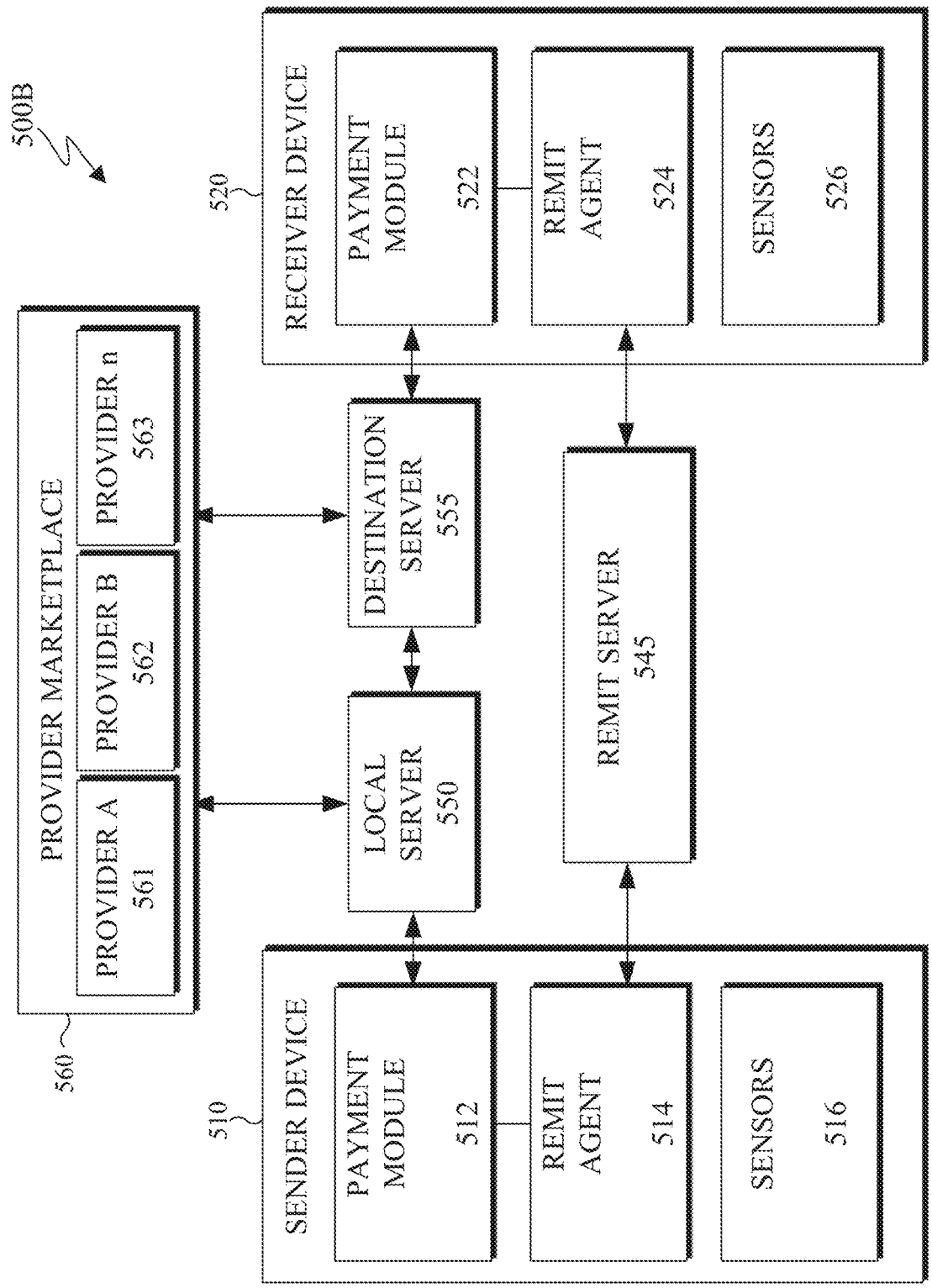

FIGS. 5A and 5B illustrate block diagrams of an example environment architecture 500A and an example environment architecture 500B, in accordance with an embodiment of this disclosure. FIGS. 5A and 5B illustrate a high-level architecture, in accordance with an embodiment of this disclosure. The embodiments of the architectures 500A and 500B shown in FIGS. 5A and 5B are for illustration only. Other embodiments could be used without departing from the scope of the present disclosure.

FIG. 5A illustrates an embodiment in which a sender device 510 and receiver device 520 are associated with a single server, namely server 530. Server 530 includes a payment server 532 and a remit server 540. FIG. 5B illustrates an embodiment in which a sender device 510 and receiver device 520 are associated with remit server 545 while the sender device 510 is associated with a local server 550, and receiver device 520 is associated with a destination server 555.

In the example shown in FIGS. 5A and 5B, illustrating environment architectures 500A and 500B respectively, sender device 510 and receiver device 520 can be configured similar to any of the one or more client devices 106-114 of FIG. 1, and may include internal components similar to that of electronic device 300 of FIG. 3. Environment architectures 500A and 500B also include a provider marketplace 560 that represents one or more providers that facilitate a transfer of monetary funds from the sender device 510 to the receiver device 520. Environment architecture 500A also includes server 530, which can be configured similar to server 104 of FIG. 1, and may include internal components similar to that of server 200 of FIG. 2. Environment architecture 500B also includes remit server 545, local server 550 and destination server 555, each of which can be configured similar to server 104 of FIG. 1, and may include internal components similar to that of server 200 of FIG. 2.

Elements of environment architecture 500A can be interconnected over a network, similar to network 102 of FIG. 1 or may include standalone devices. Similarly, elements of environment architecture 500B can be interconnected over a network, similar to network 102 of FIG. 1 or may include standalone devices. In certain embodiments, the network represents a "cloud" of computers interconnected by one or more networks, where the network is a computing system utilizing clustered computers and components to act as a single pool of seamless resources when accessed. In certain embodiments, the network is connected with one or more AI systems to assist in determining and detecting a fraudulent transaction. For example, elements of fraud transaction recognition, compliance, or liability or a combination thereof are performed by one or more third party transaction providers. In certain embodiments, the network can be connected to an information repository (such as a database) that contains a look-up tables and information pertaining to the user's biographical and biometric data for security and fraud prevention purposes.

Environment architecture 500A of FIG. 5A illustrates that sender device 510 and receiver device 520 are in communication with server 530, and server 530 is in communication with provider marketplace 560. Sender device 510 is an electronic device utilized by a sender to send money via remittance to a recipient via receiver's device 520. Sender device 510 and receiver device 520 can both be configured to be able to send and receive money via remittance. In certain embodiments, the sender device 510 sends money directly to a bank account associated with the intended receiver or a specific ATM. For example, the receiver device 520 receives a notification that a transfer was executed. The notification can state the money was transferred into the receiver's bank account. The notification can include instructions as to which ATM the receiver must go to, in order to receive the funds. In certain embodiments, receiver device 520 is a financial institution such as a bank. For example, the receiver device 520, acting as a bank, receives the transferred money and places the money in an account associated with the intended receiver. For illustration purposes only, in the examples disclosed herein, sender device 510 sends or remits money and receiver device 520 receives money. Sender device 510 and receiver device 520 can contain elements not shown including an information repository, such as a database, for storing information pertaining to biographical and biometric data for the user of each respective device. The information repository can also store information related to user preferences regarding preferred providers or criteria for selecting a provider, or both. Sender device 510 includes payment module 512, remit agent 514, and sensors 516. Receiver device 520 includes payment module 522, respectively, remit agent 524, and sensors 526.

In certain embodiments, sender device 510 and receiver device 520 can maintain identification data such as biometric data and forms of identification. The identification data can be maintained in a memory within each respective device. The identification data can be maintained within remit agent 514 and remit agent 524, respectively. The identification data can be maintained within remit server 540. The identification data can be maintained within a secure database (not shown).

Payment module 512 communicates via, or otherwise accesses, a payment service that operates under financial regulations and performed from or via a mobile device, such as sender device 510. Payment module 512 can include a user interface. Payment module 512 can require a user to register prior to accessing and services associated. Payment module 512 can be similar to a virtual wallet.

Payment module 522 can be configured similar to payment module 512. That is, payment module 522 also communicates via, or otherwise accesses, a payment service that operates under financial regulations and performed from or via a mobile device, such as receiver device 520. Payment module 522 can include a respective user interface. Payment module 522 can require a user to register prior to accessing and services associated. Payment module 522 can be similar to a virtual wallet.

According to embodiments of the present disclosure, a user can transfer money, and pay for a wide range of services and goods (both digital and hard) via a mobile device instead of paying with cash, check, or physical debit or credit cards, through either payment module 512. In certain embodiments, payment module 512 stores a virtual representation of a physical debit or credit card associated with a respective account. In certain embodiments, payment module 512 is linked to one or more bank accounts associated with the sender. Payment module 522 also can store a virtual representation of a physical debit or credit card associated with a respective account. A virtual card that has no physical counterpart, where the virtual card is linked to a specific user. Typically, the user is the user of a respective device. For example, a virtual card can reside on the payment module 512 and a second virtual card can reside on the payment module 522. Each virtual card is associated with an account for containing money. In certain embodiments, the money associated with each respective virtual card is of a currency used based on the geographic location of device, namely a sender currency based on a geographic location of the sender device 510 and a receiver currency based on a geographic location of the receiver device 520. For example, if sender device 510 is in the United States of America, the currency is in U.S. Dollars, and if the receiver's device 520 is in country of Mexico, the currency is in Pesos. The virtual card can be similar to a debit account by allowing the holder of the card to transfer money electronically to another bank account when making a purchase or a transfer.

Payment module 512 can receive information from a user to initiate a remittance. Payment module 512 can perform the authentication procedures and policies such as biometric authentication, password, PIN, and the like. Payment module 512 can obtain pre-authorized fraud and risk scores of the sender or receiver or both, and share the information with the payment server 532 within server 530. Payment module 512 can be functionally connected to payment server 532.

In certain embodiments, payment module 522 is a peer to peer direct payment, where the transferred funds are received via an account associated the mobile wallet of the receiver, such as a linked bank account, a linked virtual card, a debit card, or a linked credit card. For example, payment module 522 can receive information from a user to initiate a remittance. Payment module 522 can perform the authentication procedures and policies such as biometric authentication, password, PIN, and the like. Payment module 522 can obtain pre-authorized fraud and risk scores of the sender or receiver or both, and share the information with the payment server 532 within server 530. Payment module 522 can be functionally connected to payment server 532.

In certain embodiments, remit agent 514 is an agent on sender device 510 that manages the intelligence, fraud prevention, and supports compliance data. For example, remit agent 524 can prevent specific senders or devices from transferring money. For instance, if the sender device 510 is reported as stolen, remit agent 524 can prevent a transfer of funds, regardless if the biometric data and other forms of identification are satisfied. In certain embodiments, remit agent 514 is a standalone entity on the sender device 510. In certain embodiments, the remit agent 514 is part of the payment module 512 on sender device 510. For example, the remit agent 514 can provide the remittance function on payment module 512 when performing a transaction. Remit agent 514 works in tandem with the remit server 540 and the payment server 532. Remit agent 514 can determine security credentials, provide a list of providers (such as provider A 561, provider B 562 through provider n 563) through a provider marketplace 560, select a provider that matches the user's criteria, suggest a recommended provider, negotiate prices with each provider, confirm the deliverance of moneys transfer from a sender to a receiver. In certain embodiments, remit agent 514 is provided as a software development kit (SKD). By utilizing SKD, third party entities can utilize and develop mobile remittance. In certain embodiments, remit agent 514 is functionally connected to remit server 540 through server 530.

In certain embodiments, remit agent 524 is an agent on the receiver device 520 that manages the intelligence, fraud prevention, and supports compliance data. For example, remit agent 524 can prevent specific persons or devices from receiving money. In certain embodiments, remit agent 524 is a standalone entity on the receiver device 520. In certain embodiments, the remit agent 524 is part of the payment module 522 on receiver device 520. For example, the remit agent 524 can provide the remittance function on payment module 522 when performing a transaction. Remit agent 524 works in tandem with the remit server 540 and the payment server 532. Remit agent 524 can determine security credentials, provide a list of providers (such as provider A 561, provider B 562 through provider n 563) through a provider marketplace 560, select a provider that matches the user's criteria, suggest a recommended provider, negotiate prices with each provider, confirm the deliverance of moneys transfer from a sender to a receiver. In certain embodiments, remit agent 524 is provided as a SKD. By utilizing SKD, third party entities can utilize and develop mobile remittance. In certain embodiments, remit agent 524 is functionally connected to remit server 540 through server 530.

Sensors 516 are similar to the sensor 365 and the biometric scanner 370 of FIG. 3. Similarly, sensors 526 are similar to the sensor 365 and the biometric scanner 370 of FIG. 3. Sensors 516 can detect environmental information and identifying user information, for authentication purposes. Sensors 526 also can detect environmental information and identifying user information, for authentication purposes. Sensors 516 and 526 are discussed in further detail with respect to FIG. 6.

Sender device 510 and receiver device 520 are in communication with server 530. Server 530 is in communication with provider marketplace 560. Server 530 represents a single server that includes a payment server 532 and a remit server 540. Payment server 532 and remit server 540 can represents individual servers associated with server 530 or individual programs within server 530. In certain embodiments, payment server 532 and remit server 540 can be a single entity located on server 530.

Payment server 532 represents a server that oversees financial transactions including transferring monetary funds from one account to another account. For example, payment server 532 can manage the transfer of funds into and out of a user's financial account (associated payment module 512 or 522 or both) account.

In certain embodiments, payment server 532 includes token service provider (not shown), connected to one or more financial entities (not shown). Payment server 532 manages the user registration process and generates a fraud score as described in FIG. 9 below. In certain embodiments, the payment server 532 oversees or performs the remittance transaction. For example, payment server 532 can provide a remit function to a user through simple application execution via payment module 512 or 522 or remit agent 514 or 524 or a combination thereof. Payment server 532 receives information relating to the payment function or a remittance function or both. In certain embodiments, payment server 532 includes information pertaining to a virtual card associated with a wallet application, such as payment module 512 and 522. Payment server 532 can include a SDK. Additionally, the payment server 532 can include an API server relating to the payment application In certain embodiments, payment server 532 receives remittance or payment related information from sender device 510 and receiver device 520, and transmits the information related to the transfer of money to a 3rd party such as a provider A 561. Payment server 532 can transmit or receive information between both the sender device 510 and the receiver device 520, with a token service provider. Payment server 532 can manage one or more virtual cards and other accounts linked with payment module 512 and 522.

Remit server 540 can functions in tandem with remit agent 514 and 524, on each respective device. Remit server 540 can determine security credentials, provide a list of providers, select a provider that matches the user's criteria, suggest a recommended provider (via provider marketplace 560), negotiate prices with each provider, confirm the deliverance of moneys transfer from a sender to a receiver. For example, remit server 540 also can negotiate prices and fees associated with the remittance with one or more providers within the provider marketplace 560. Remit server 540 can also provide recommendations to a particular provider via the remit agent 514 on sender's device 510. For example, based on the sender inputted information (such as amount of money, time/date of transfer, location of transfer, and the like), each provider within the provider marketplace 560 (such as provider A 651 through provider n 563) can require different fees for the transaction. Remit server 540 can be associated with payment server 532 to perform remittance and transfer of money.

In certain embodiments, remit server 540 performs deep learning on the behavioral and historical user data of the sender and the receiver. The deep learning can be coupled with social media, contextual and predictive artificial intelligence queries on analyzing the capabilities and security credentials of the sender and receiver. Remit server 540 can provide a summarized fraud score and predict user's future transaction. Remit server 540 can include a SDK. Additionally, the remit server 540 can include an API server relating to the payment application. Remit server 540 is discussed in further detail with respect to remit server 650 of FIG. 6.

Provider marketplace 560 includes a plurality of providers such as provider A 561, provider B 562 through provider n 563. Provider marketplace 560 represents marketplace of providers that are registered and associated with server 530. Provider marketplace 560 represents a list of providers that perform the transfer electronically for consumers to people and businesses in foreign countries. In certain embodiments, each provider, provider A 561 through provider n 563 are registered and associated with remit server 540. Provider marketplace 560 can include for example, banks, credit unions and the like. When requested, each provider, provider A 561 through provider n 563, delivers to the server 530 exchange rates, taxes, fees, delivery time, and the like. Exchange rates, transaction fees, and transaction deliver speeds can vary from one provider to another for each requested transaction.

For example, a sender can select a particular provider, from the provider marketplace 560, such as provider A 561 to transfer money. For example, the sender can select provider 561A through remit agent 514 to transfer money electronically to a foreign country. The sender then selects a particular individual to receive the money. Thereafter provider A 561 performs the transaction and transfers the money from the user's account to an account associated with the intended receiver. In certain embodiments, the sender selects a particular provider. In certain embodiments, remit server 540 parses through each provider's transaction information to select or suggest one or more recommended providers for a given transaction.

Environment architecture 500B of FIG. 5B illustrates sender device 510 and receiver device 520 in communication with remit server 545. Environment architecture 500B also illustrates sender device 510 in communication with local server 550, and receiver device 520 in communication with destination server 555. Environment architecture 500B illustrates both local server 550 and destination server 555 in communication with provider marketplace 560. Sender device 510, receiver device 520, and provider marketplace 560 of FIG. 5B, represent the same elements of FIG. 5A. Descriptions associated with such elements are detailed with reference to FIG. 5A.

Local server 550 and destination server 555 represent individual servers performing similar functions as payment server 532 of FIG. 5A. Local server 550 oversees financial transactions including transferring monetary funds from associated with payment module 512 on sender device 510. Similarly, destination server 555 oversees financial transactions including transferring monetary funds from associated with payment module 522 on receiver device 520. Local server 550 can provide a list of providers that can perform the transfer or negotiate prices with each provider or both. Local server 550 and destination server 555 can communicate with each other. For example, local server 550 can transmit the unique transaction identifier associated with a given remittance to destination server 555 to be delivered to receiver's device 520. By transmitting the unique transaction identifier, receiver device 520 can receive the transferred money from the selected provider without any direct input from the sender. Local server 550 and destination server 555 can manage a financial account associated with payment module 512 and payment module 522 respectively. In certain embodiments, local server 550 communicates with provider marketplace 560 and remit agent 514 recommends a particular provider to perform the transaction. That is, the remit agent 514 can provide a suggested provide to the user. In certain embodiments remit server 545 can provide a suggested provide to the user.

Remit server 545 can be similar to remit server 540 of FIG. 5A. Remit server 545 can perform analytics and associated with fraud detection. Remit server 545 can determine security credentials, select a provider that matches the user's criteria (based on the received information from local server 550), suggest a recommended provider, and the like. Remit server 545 can register each provider, and the local server 550 and the destination server 555 can negotiate prices and fees associated with the remittance with one or more providers. Remit server 545 can provide recommendations to a particular provider via the remit agent 514 on sender's device 510.

Figure 6:
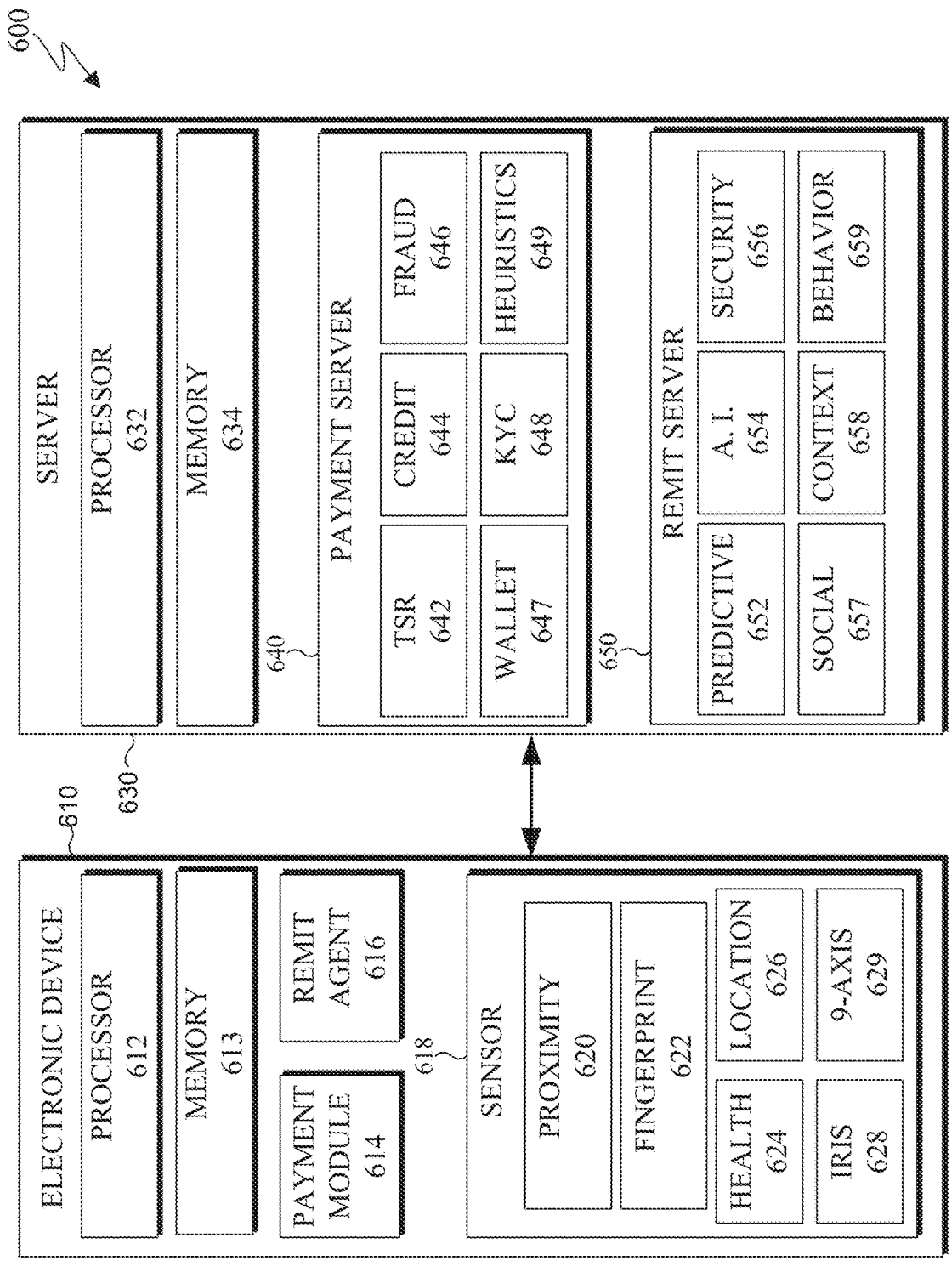
FIG. 6 illustrates an example block diagram in accordance with an embodiment of this disclosure.

FIG. 6 illustrates an example block diagram in accordance with an embodiment of this disclosure. FIG. 6 illustrates a high-level framework of a user device and a server in accordance with an embodiment of this disclosure.

FIG. 6 illustrates environment 600 and includes an electronic device 610 and a server 630. Electronic device 610 can be configured similar to any of the one or more client devices 106-114 of FIG. 1, and can include internal components similar to that of electronic device 300 of FIG. 3, and represent sender device 510 or receiver device 520 of FIGS. 5A and 5B or both. Server 630 can be configured similar to server 104 of FIG. 1 can include internal components similar to that of server 200 of FIG. 2 and can represents server 530 of FIG. 5A, as well as remit server 545, local server 550, and destination server 555 of FIG. 5B.

Electronic device 610 includes processor 612, memory 613, payment module 614, remit agent 616, and sensor 618. Processor 612 is similar to processor 340 of FIG. 3. Payment module 614 is similar to payment module 512 and payment module 522 of FIGS. 5A and 5B. Remit agent 616 is similar to remit agent 514 and remit agent 524 of FIGS. 5A and 5B. Memory 613 is similar to memory 360 of FIG. 3. Processor 612, memory 613 payment modules 614, and remit agent 616 are described above.

Electronic device 610 captures data associated with the user and data from sensors 618 and provides such information to server 630 via payment module 614, or remit agent 616, or a combination thereof. Data associated with the user can include a user profile stored in memory, the user's social media presence, or previous transaction data or a combination thereof. Sensor 618 is similar to sensor 365 and biometric scanner 370 of FIG. 3. Sensor 618 can include one or more sensors such as: a proximity sensor 620, a fingerprint scanner 622, a health analyzer 624, a location sensor (similar to GPS) 626, an iris scanner 628, and a 9-axis motion detector 629.

Proximity sensor 620 determines the location of the electronic device in proximity to known locations. Proximity sensor 620 can utilize locating information obtained location sensor 626. In certain embodiments proximity sensor 620 is utilized to as an additional layer of security and fraud detection, by confirming the identity of the user. For example, the user can pre-designate safe locations, such as a home or work or work of the user. A safe location can represents specific locations where a sender can initiate a remittance transaction. If a transaction request occurs at a location other than a designated safe location, the user's account can be flagged for further fraud analysis.

Fingerprint scanner 622 reads fingerprint biometric information. The fingerprint scanner 622 can be a fingerprint reader used to identify the user based on the biometrics of an impression formed by friction ridges of a human finger. Health analyzer 624 utilizes various sensors to determine the health of the user. For example, health analyzer 624 can derive the beats per minute of the user's heart rate, a user's stress level (based on fluctuations in the user's heart rate), a user's temperature, and the like. Location sensor 626 utilizes a global positioning system (GPS) information to identify the location of the electronic device. Iris scanner 628 is used to identify the user based on the biometrics of an iris of a human eye.

The 9-axis motion detector 629 can include accelerometers, gyro-sensors, motion sensors and the like. The 9-axis motion detector 629 can determine whether the electronic device 610 is stationary or mobile. For example, the 9-axis motion detector 629 can learn various movements of the user. Movements can include a user's gait (does the user walk evenly, limp drag a foot), how the user removes the electronic device from the user's pocket (if the electronic device is a mobile phone), the phone's location on the user (such as in a pocket, in a purse, currently being held), and the like. In certain embodiments these movements and others are utilized to as an extra layer of security and fraud detection, by confirming the identity of the user. If a transaction request occurs and the request is determined that it was not the user who initiated the transaction, based on the user's gait being different, or the electronic device was removed from the user's pocket in a unpredictable manner, the user's account can be flagged for further fraud analysis.

Server 630 includes processor 632, memory 634, payment server 640, and remit server 650. Processor 632 is similar to processing device 210 of FIG. 2 or processor 340 of FIG. 3. Memory 634 is similar to storage devices 215 of FIG. 2 or memory 360 of FIG. 3. In certain embodiments, payment server 640, and remit server 650 represent separate logical entities located on the same physical server. In certain embodiments, payment server 640 and remit server 650 are implemented separately. In certain embodiments, payment server 640 is similar to payment server 532 of FIG. 5A, local server 550 and destination server 555 of FIG. 5B. In certain embodiments, remit server 650 is similar to remit server 540 of FIG. 5A and remit server 545 of FIG. 5B.

Payment server 640 oversees or performs the remittance transaction. For example, payment server 640 can provide a remit function to a user through simple application execution via payment module 614 and remit agent 616. In certain embodiments, payment server 532 includes information pertaining to a virtual card, and monetary funds associated therewith. Payment server 640 can include one or more elements such as transaction status record (TSR) 642, credit score 644, fraud detector 646, wallet 647, know your customer (KYC) 648, heuristics 649.

TSR 642 encompasses previous transaction the sender or the receiver or both have executed. TSR 642 can contain information pertaining to previous successful transactions and previous attempts of fraudulent or illicit activities. Such information is utilized when generating a fraud score.

Credit 644 monitors a credit score of the user. For example, dependent on the user's credit score, the level of security can fluctuate. In certain embodiments, a user with a lower credit score requires additional fraud detection than a user with a higher credit score.

Fraud 646 includes a fraud risk analysis of the user. In certain embodiments a user ranks as a high fraud risk, based on certain criteria. If the sender or user is identified as a fraud risk, in certain embodiments additional identifying information is requested of the user, and the information is provided to each provider within the provider marketplace 560 of FIGS. 5A and 5B. If the sender or user is identified as a fraud risk, in certain embodiments the transaction can be denied. For example, if the user is sending money to a country with high incidence of fraud, fraud 646 can require additional information from the sender or the receiver or both. In another example, if the user of electronic device 610 is identified as not be the true user of the device (such as if the electronic device 610 is stolen) additional information from the sender or the receiver or both. In another example, if the fingerprint scanner 622 is unable to confirm the identity of the user, then fraud 646 can require different forms of identification to confirm the identity of the user. A further description of fraud 646 is discussed below with respect to FIG. 9.

Wallet 647 manages the digital wallet associated with payment module 614. Wallet 647 allows user to conduct financial transactions over the electronic device 610. In certain embodiments, wallet 647 is linked to one or more of a virtual card, a bank account, a debit card, a credit card, driver's license, other forms of user identification, and the like. Wallet 647 can access monetary funds from a virtual card or a linked bank account in order to transfer and receive money. Wallet 647 can contain various forms of user identification such as the user's driver's license or passport. Such forms of identification can be used to prevent fraud. For example, a user can be required to provide their driver's license number prior to transferring money, and wallet 647 confirms the numbers match, prior to the payment server 640 executing the transfer.

Wallet 647 also can utilize a token service provider (TSP) (not shown) to protect sensitive information with a non-sensitive equivalent. For example, the token is a reference identifier that maps to sensitive data through a tokenization system. A TSP can protect cards and personal information contained within wallet 647.

KYC 648 identifies a customer through a variety of mechanisms. KYC 648 includes processes that allow a financial organizations to identify and verify the identity of each client, in order to prevent fraudulent activities. In certain embodiments, KYC 648 includes collecting and analyzing basic identity information of each user. In certain embodiments, KYC 648 determines the user's risk to commit various misconducts such as fraud, money laundering, identity theft, and the like. KYC 648 can also monitor the transactions of the user against expected behavior and recorded profiles as well as that of the user's peers.

Heuristics 649 monitors previous transaction of a user to identify any unusual transaction. For example, if the user generally transfers sums of money less than $1,000 and then suddenly transfers $10,000, heuristics 649 can flag the account for further fraud analysis. In certain embodiments, heuristics 649 automatically flags any transaction over a set amount, as set by the user or payment server 640. The set amount can be pre-set by the user or a financial manager or based on specified criteria.

Remit server 650 oversees various aspects of the remittance transaction. For example, remit server 650 can perform analytics and associated with fraud detection and managing the providers within provider marketplace 560. Remit server 650 can determine security credentials, provide a list of providers, select a provider that matches the user's criteria, recommended one or more providers, negotiate prices with each provider, and the like. Remit server 650 includes one or more elements such as predictive 652, artificial intelligence (A. I.) 654, security 656, social 657, context 658, and behavior 659

Predictive analytics 652 analyzes and predicts when the user will perform the next transaction. For example, if every two weeks the user transfers approximately the same amount of money to the same location, predictive analytics 652 can monitor the list of providers and provide a notification to the user as to an ideal date and time to perform the next transaction. An ideal date and time can be determined based on lower fees, a more advantageous exchange rate, a quicker deliver, and the like. Predictive analytics 652 can also provide a push notification reminder to the user to transfer the money if no transfer occurred within the derived predictive pattern. For example, if the user regularly transfers approximately $500 every two weeks, predictive analytics 652 can set a reminder for the user to transfer money.

A. I. 654 includes deep learning and is designed and constructed to recognize and learn more about the user's behavior. For example A. I. 654 can include deep learning processes to analyze data received from the user to reduce fraud, and improve user's experience. In certain embodiments, A. I. 654 includes analyzing each provider's fees and suggests a particular provider for the user to utilize. In certain embodiments, A. I. 654 is able to derive a pattern of use, for example, when the user transfers a sum of money over a regular period of time. A. I. 654 is able to further suggest a date and time to transfer the sum of money. A. I. 654 is able to further suggest an amount of money to transfer in addition to a date and time to if the fee is reduced.

Security 656 analyzes the user and received information to minimize and reduce risk for the providers. Security 656 protects against fraud. Security 656 can communicate with fraud 646, in order to reduce fraud.

Social 657 represents social media data of the user. Server 630 receives social media data of the user via electronic device 610 and analyzes the data. In certain embodiments, the user's social media data indicates that the user has a higher risk of fraud. In certain embodiments, the amount of social media presence indicates that the user has a higher risk of fraud.

Context 658 analyzes the context of information associated with the user to confirm the identity of the user. For example context 658 can analyze the environment of the user to derive context associated with past actions of a user in order to predict future actions of the user. Context 658 derives relationships and trends between a multitude of events and actions of the user. Context 658 can organize un-structured data, such as data from sensor 618. For example, context 658 can learn the gait of the user or how the user removes electronic device 610 from the users pocket. Context 658 can also include natural language processing.

Behavior 659 analyzes the behavior of the user based on the information from one or more of sensor 618. For example, if proximity sensor 620 indicates the user executing a transfer a predetermined distance from a designated safe area, user's account can be flagged for further fraud analysis. Similarly, based on readings from the 9-axis motion detector 629, behavior 659 can identify that a person other than the user was walking with the electronic device 610, prior to initiating a transfer. Behavior 659 can flag the transaction and require further fraud analysis such as a fingerprint reading or an iris scan from fingerprint scanner 622 or iris scanner 628.

Figure 7:
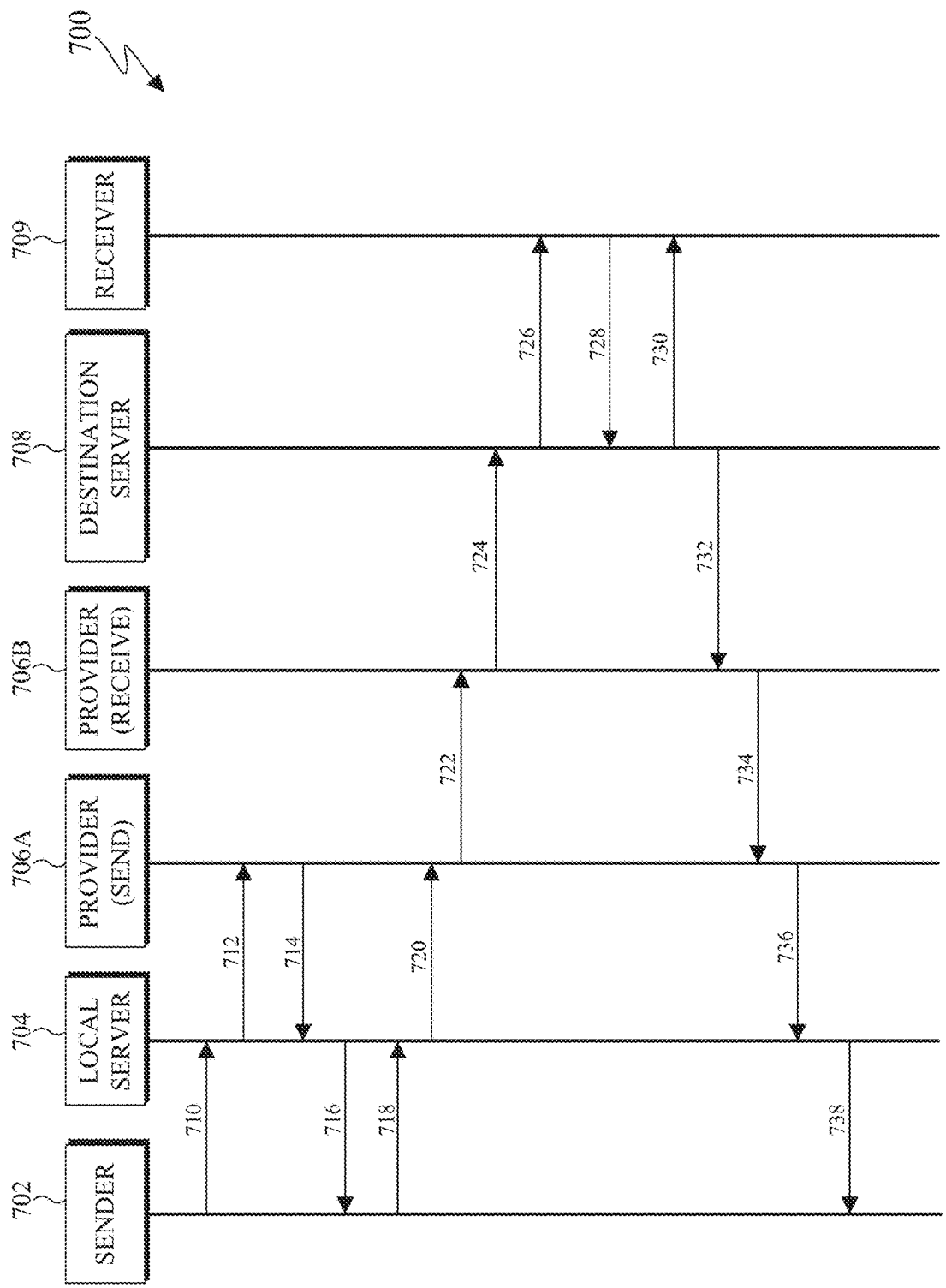
FIG. 7 illustrates an example of information transmission in accordance with an embodiment of this disclosure.

FIG. 7 illustrates an example of information transmission in accordance with an embodiment of this disclosure. FIG. 7 illustrates process diagram 700 depicting a closed loop remittance, according to an embodiment of the present disclosure. Process diagram 700 includes sender 702, local server 704, provider (send) 706A, provider (receive) 706B, destination server 708, and receiver 709. While the flow chart depicts a series of sequential signals, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

Process diagram 700 depicts a closed loop remittance. In certain embodiments process diagram 700 is able connects information for remittance across non-digital channels to the digital wallet via a closed loop remittance model. Non-digital channels can include accounts that are not native to the virtual wallet such as a credit card, a debit card, a bank account.

In certain embodiments, sender 702 is similar to electronic device 610 of FIG. 6, sender's device 510 of FIGS. 5A and 5B, one or more client devices 106-114 of FIG. 1, and can include internal components similar to that of electronic device 300 of FIG. 3. In certain embodiments, receiver 709 is similar to electronic device 610 of FIG. 6, receiver's device 520 of FIGS. 5A and 5B, one or more client devices 106-114 of FIG. 1, and can include internal components similar to that of electronic device 300 of FIG. 3. In certain embodiments, local server 704 is similar to server 630 of FIG. 6, remit server 545 and local server 550 of FIG. 5B, server 530 of FIG. 5A, server 104 of FIG. 1, and can include internal components similar to that of server 200 of FIG. 2. In certain embodiments, destination server 708 is similar to server 630 of FIG. 6, remit server 545 and destination server 555 of FIG. 5B, server 530 of FIG. 5A, server 104 of FIG. 1, and can include internal components similar to that of server 200 of FIG. 2. In certain embodiments, provider (send) 706A and provider (receive) 706B is similar to any of the providers within the provider marketplace 560 of FIGS. 5A and 5B. In certain embodiments, provider (send) 706A and provider (receive) 706B are the same entity, but in different locations. For example, provider (send) 706A is located in the country of the sender 702, and provider (receive) 706B is located in the country of the receiver 709.

A monetary transfer process 700 commences when sender 702 initiates a transfer of money 710 to receiver 709 located in a foreign country, via provider (send) 706A and provider (receive) 706 B. The local server 704 receives user information from sender 702 via transaction 710. User information may include an amount of money to transfer, the information to designate the receiver 709, and information to authenticate the user. The local server 704 analyzes the received information and generates a fraud score and a predict score. Thereafter, the local server 704 transfers 712 the user information along with the generated fraud score and a predict score to provider 706A. The provider (send) 706A determines a transaction fee, exchange rates, and delivery time for the given transaction and transmits the information 714 to the local server 704. When multiple providers are present in the marketplace, such as providers A 561 through provider n 563 of FIG. 5A, the transfer of the user information along with the generated fraud score and a predict score, the determination of transactions fees, exchange rates and delivery times, and the transfer of the information to the local server 704 is repeated for each provider.

In certain embodiments, the local server 704 determines and transmits 716 suggested provider 716, such as provider (send) 706A, to sender 702 to utilize for the transaction. If sender 702 is provided a suggested provider, the sender 702 can accept or reject the provider (send) 706A. In certain embodiments, the local server 704 transmits 716 the received transaction details, fees, exchange rates to the sender 702. The sender can then select a provider, such as provider (send) 706A, to utilize for the transaction from a plurality of providers.

The sender 702 transmits a confirmation 718 to the server 704 confirming of the senders 702 acceptance of the suggested provider or confirming the senders 702 selected provider. If the server 704 receives 718 the user's rejection of the suggested provider, the server 704 can determine a different suggested provider, or transmit to sender 702 a list of providers with respective transaction details, fees exchange rates for user to select a provider.

The local server 704 transmits 720 the money to be transferred to the receiver 709 to provider (send) 706A. The provider (send) 706A transmits 722 both the money and information about the receiver 709 to provider (receive) 706B. The provider (receive) 706B transmits 724 the money to the destination server 708

The destination server 708 transmits a both a notification of the virtual card and an authorization challenge 726 to the receiver 709. The receiver transmits a response 728 to the destination server 708. Response 728 can include biometric identification, document validation, a PH, a PIN, a password, a passphrase or a unit transaction identifier receiver 709 received from sender 702. The destination server 708 confirms the identity of the receiver 709 and then transmits the virtual card 730 to the receiver 709.

The destination server 708 transmits a status update 732 to provider (receive) 706B. The provider (receive) 706B transmits a status update 734 to the provider (send) 706A. The provider (send) 706A transmits a status update 736 to the local server 704. The local server 704 transmits a confirmation 738 to sender 702 that the transfer is complete.

Figure 8A:
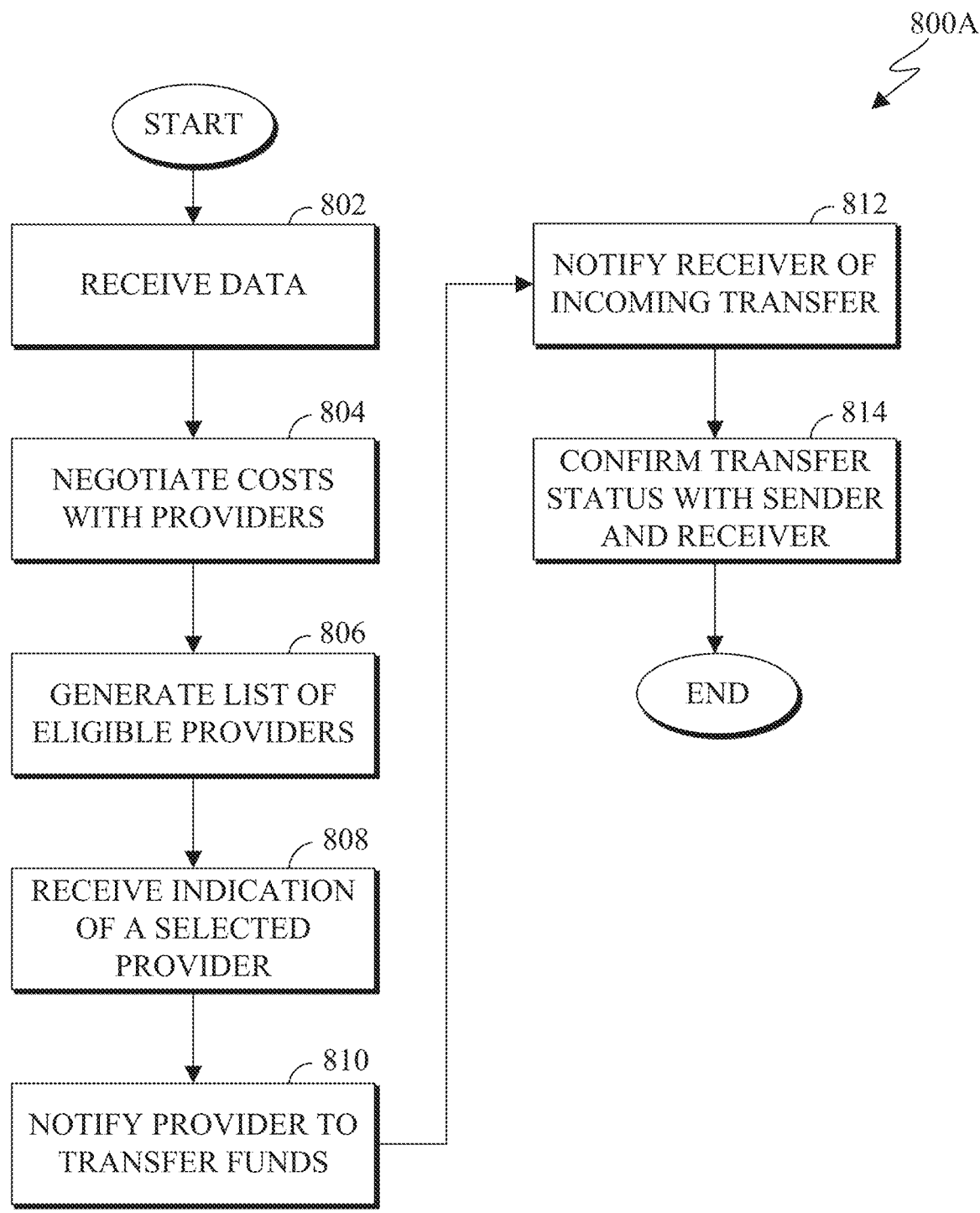
FIG. 8A illustrates an example method of a server transferring monetary funds, in accordance with an embodiment of this disclosure.

FIG. 8A illustrates an example method transferring monetary funds in accordance with an embodiment of this disclosure. While process 800A depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the method transferring monetary funds is described with respect to the system 100 of FIG. 1 and environment 500A of FIG. 5A. However, the process 800A could be used with any other suitable system.

Prior to server 530 commencing process 800A, server 530 creates a marketplace of providers allowing for quick negotiations between server 530 and each provider. The marketplace can represent a listing of registered providers that can offer transaction quotes, perform a remittance transaction, and while satisfying governmental regulations (according to the country of the potential sender and the country of a potential receiver) to minimize fraudulent activities. Additionally, prior to server 530 commencing process 800A, both the sender and the receiver are registered, allowing server 530 to obtain information about the user for fraud analysis. Alternatively, the sender and a receiver can be registered concurrently with process 800A, to provide server 530 with information about both the sender and the receiver for fraud analysis.

In block 802 the server 530 receives a request from a sender to transfer money to a receiver. Server 530 receives information pertaining to an amount of money to transfer and identifying information of the intended receiver. In certain embodiments, the sender is authenticated using biometrics or credentials or a combination thereof. In certain embodiments, server 530 generates a fraud score associated with the sender. In another embodiment the sender's device 510 generates the fraud score and transmits the information to server 530 for further processing and analytics. The fraud score is discussed below with respect to FIG. 9.

In certain embodiments, server 530 performs deep learning using A. I. based on the sender's behavioral characteristics and historical data. The deep learning is based on the sender's social media presence, contextual analysis, predictive artificial intelligence queries based on analyzing the sender's capabilities and security credentials. In certain embodiments, the server 530 authenticates the sender via biometrics, credentials, and a variety of fraud prevention services. In certain embodiments, server 530 associates a unique transaction identifier with the mobile identity of the sender and second unique transaction identifier with the mobile identity of the receiver to authenticate the sender and the receiver. The unique transaction identifier is linked to biometric scans of the sender and receiver, respectively.

In block 804, server 530 negotiates transaction costs with providers from the provider market place (similar to provider A 561 of FIGS. 5A and 5B) based location of the receiver obtained from the received data. For example, the provider A 561 can only transfer funds between country A and country B whereas the provider B 562 can only transfer funds between country A and country C. Therefore, the server 530 negotiates prices with only the providers that can perform the remittance.

In certain embodiments, server 530 transmits to the providers in the marketplace the generated fraud score, and information pertaining to the transaction including sender's and receivers information such as the location of each party, the amount of money being transferred, and a delivery date and time (if the delivery is not intended to be near instantiations).

Server 530 then receives information from each provider indicating the fees associated with the transfer and the exchange rates. Each provider can then provide a different exchange rate and fees for the transaction.

In block 806 the server 530 compiles the received information from each provider and generates a list of eligible providers along with each provider's fees and exchange rates. In certain embodiments, server 530 can transmit such information a client device allowing the sender to select a provider. In certain embodiments, server 530 can perform an analysis and determine on the sender's behalf a provider to utilize. The decision can be based on predefined criteria by the user as defined in real-time or in the sender's registration processes, or a combination thereof. In another embodiment, server 530 can generate a shortened list of providers based on predefined criteria by the user. For example, the server 530 provides the sender with a list of the top three providers in order of preference, thereby allowing user to perform the final selection of a provider.

In block 808 the server 530 receives an indication that the sender approves the transaction. In certain embodiments, server 530 transmits to the sender's device 510 a summary of the transaction, including the intended receiver, amount to transfer, the provider, the fees associated with the transaction, exchange rates, the total expected withdrawal from the sender's account (transferred money plus the provider's fees), and the total expected to be deposited to the receiver based on the foreign currency (transferred money based on the exchange rate).

In block 810 the server 530 notifies the selected provider to commence the transaction. The notification can include the server 530 transferring the money from the sender to the provider. In certain embodiments, the sender transfers the money from a virtual card. It is noted that the virtual card can include a credit card, a debit card, and a bank account. In certain embodiments, the sender transfers the money from directly from a linked bank account.

Thereafter in block 812 the server 530 notifies the receiver of the incoming transfer and creates a virtual card for the receiver. In certain embodiments, if the receiver already has a virtual card, the server 530 does not create a new one, unless receiver requests a new virtual card. The virtual card is the intended location into which the provider is to transfer the money. The server 530 can notify the intended receiver on the availability of the transfer with an authentication challenge. The authentication challenge includes using biometrics or credentials or a combination thereof. The biometrics a credentials can be obtained when the receive registers with server 530. Server 530 performs the authentication challenge to validate the receiver as an additional layer of fraud protection.

In certain embodiments the server 530 provides the receiver with a unique transaction identifier. The receiver's device can then transmit the unique transaction identifier to the provider, to confirm the identity of the receiver, whereupon the provider releases the money to the receiver.

In block 814 the server 530 receives a notification from the provider that the transfer is complete. In certain embodiments, server 530 verifies the added monetary funds on the virtual card of the receiver. Server 530 provides a confirmation of a successful transfer to both the sender and the receiver. In certain embodiments, server 530 can update the user profiles of the both the sender and the receiver, indicating a successful transfer.

In certain embodiments, server 530 concludes the monetary transfer process after block 810, and blocks 812 and 814 are omitted. In certain embodiments, blocks 802 through 810 are performed by local server 550 and remit server 545 of FIG. 5B or local server 704 of FIG. 7. In certain embodiments, blocks 812 through 814 can be performed by destination server 555 and remit server 545 of FIG. 5B or destination server 708 of FIG. 7.

Figure 8B:
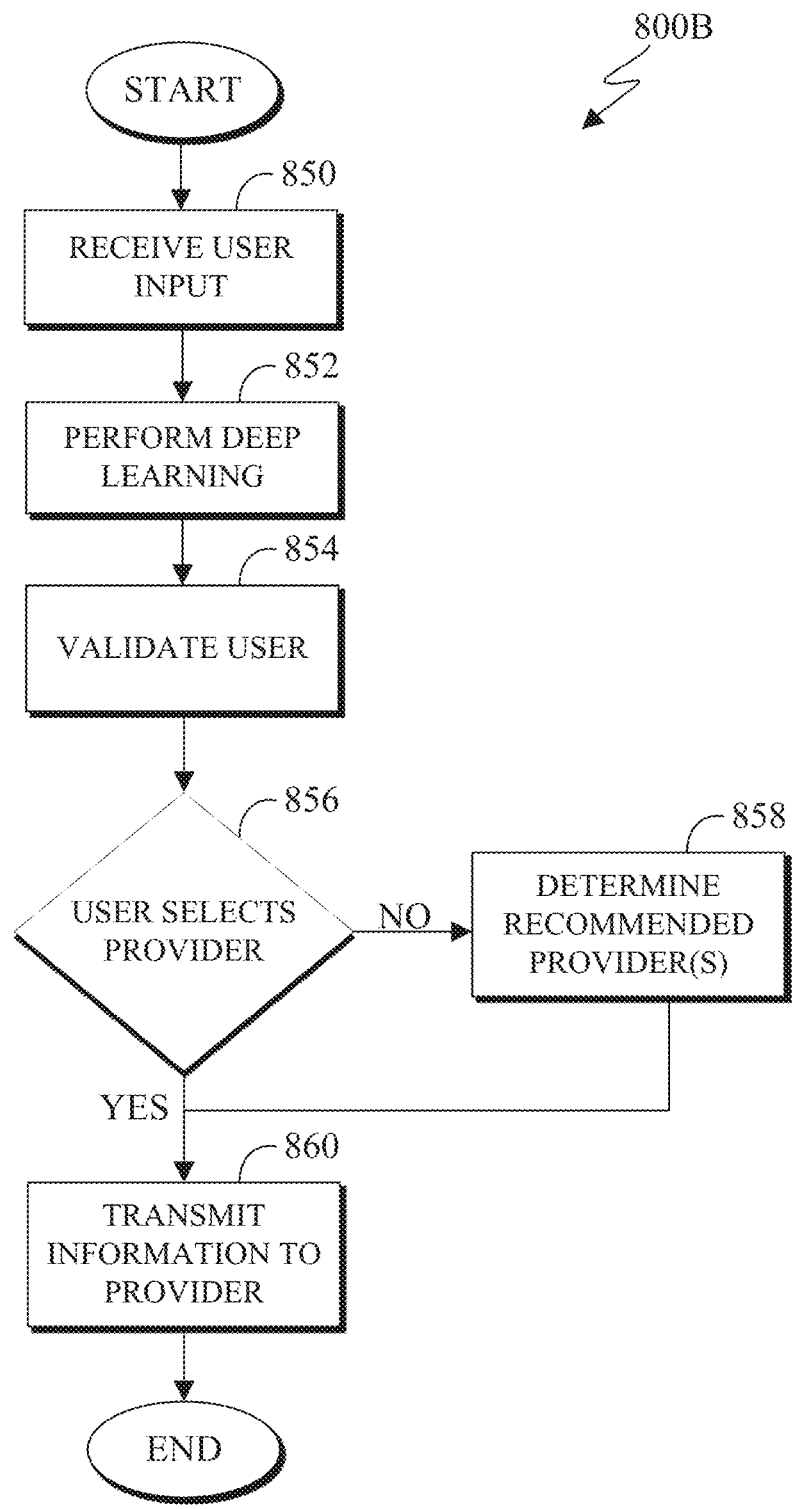
FIG. 8B illustrates an example method of a client devices interface for transferring monetary funds, in accordance with an embodiment of this disclosure.

FIG. 8B illustrates an example method of a client devices interface for transferring monetary funds, in accordance with an embodiment of this disclosure. In certain embodiments, process 800B is optional, when completing a payment transfer. While process 800B depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the method transferring monetary funds is described with respect to the system 100 of FIG. 1, environment 500A of FIG. 5A, and environment 600 of FIG. 6. However, the process 800B could be used with any other suitable system.

Process 800B illustrates remit agent 514 on sender's device 510, of FIGS. 5A and 5B, initiating the transfer of money. Remit agent 514 on sender device 510 shares transactional data to commence the transfer. Remit agent 514 can encompass the payment module 512. For example, the payment module 512 includes the digital wallet including the virtual card. Remit agent 514 is activated within payment module 512 when a sender initiates a remittance.

At block 850 remit agent 514 receives user input. User input includes a request from a sender to transfer money to a receiver. The user input can represent a set of transaction information. In certain embodiments the transaction information can include all the information needed to transfer the funds such as, the recipient, delivery speed, amount of money to transfer, and the like. In certain embodiments the transaction information can include only the information about the recipient (the receiver), thereafter once the request is initiated, the sender can later input the additional information such as the amount to transfer and the speed to perform the transaction. Remit agent 514 can auto predict the sender input while the sender is inputting information. For example, when the sender inputs an intended receiver, remit agent 514 auto inputs the destination country, based on previous transaction, or a lookup table containing the last known location of the intended receiver. Remit agent 514 can analyze the information that includes amount of money to transfer and identifying information of the intended receiver.

Remit agent 514 can offer multiple delivery methods of the transfer to the receiver. The sender can select that the transfer to be delivered to either the receivers virtual card, the receivers bank account, or to an agent where the receiver must physically go to collect cash. Remit agent 514 can provide the sender with multiple delivery speeds, such as instantaneous (or nearly instantaneous), one hour, 1 business day, 3-5 business days, and the like.

At block 852 remit agent 514 performs deep learning to authenticate the user using biometrics or credentials or a combination thereof. In certain embodiments, remit agent 514 generates a fraud score associated with the sender. In another embodiment remit agent 514 generates a provisional fraud score and transmit the information to server 530 for further processing and analytics. Remit agent 514 can perform deep learning using A. I. based on the sender's behavioral characteristics and historical data. The deep learning can be based on the sender's social media presence, contextual analysis, predictive artificial intelligence queries based on analyzing the sender's capabilities and security credentials. In certain embodiments, remit agent 514 can continually gather information and transmit the information to a server for further processing. The server is the remit server 540 of FIG. 5A, remit server 545 of FIG. 5B, or remit server 650 of FIG. 6. If, in block 852, any analytical process flags the sender of the transaction as a potential fraudulent activity, additional authentication procedures are required.

At block 854 the remit agent 514 validates and authenticates the user. If the sender is not previously registered, the remit agent 514 can prompt user to register. The registration procedure provides the remit agent 514 with user information allowing the remit agent 514 performs deep learning to authenticate the user in block 852

In certain embodiments, the sender's biometrics are linked to their bank account. Therefore, if the sender is not validated through a biometric scan, remit agent 514 can be denied access to the sender's account, thereby preventing any unauthorized transfer of money.

Additionally, at block 854, remit agent 514 can transmit the transaction information to the marketplace of providers in order to receive information from the providers regarding fees, exchange rates, and delivery times for the pending transaction. In certain embodiments, remit agent 514 transmits the information directly to the provider marketplace. Alternatively, remit agent 514 can transmit the information to a server that forwards the information to the provider marketplace.

At decision 856 the remit agent 514 receives an indication for sender as to whether the user or the remit agent 514 will select a provider. In certain embodiments, the outcome of decision 856 is predetermined. For example, during the sender's registration process, the sender can indicate whether (i) the user will select the provider, (ii) remit agent 514 selects the provider, or (iii) remit agent 514 suggests a quantity of providers.

If the user does not select a provider, then in block 858 remit agent 514 determines a recommended provider(s). A recommended provider matches one or more criteria provided by the user, such as lowest fees, preferred providers, delivery times, and the like. Remit agent 514 can select a top provider or suggest a small quantity of providers to the user, and allow the user to select the provider from a shortened list. The selection of providers is discussed in more detail with respect to FIG. 12.

If the user selects a provider or remit agent 514 (or an associated server) selects a provider for the sender, in block 860, remit agent 514 transmits the information to the selected provider to transfer the money from the sender to the receiver.

In certain embodiments processes 800A and 800B are abridged. For example, the sender first, selects to remit money to a recipient. The sender then selects a provider. The sender can provide additional personal information, if requested by the selected provider. The sender then submits the amount of money to transfer, and the delivery speed of the transaction. Thereafter, the sender confirms the transaction. Authentication to confirm the identity of the sender is performed. The provider then sends the money to the recipient. Finally the sender, the receiver, or both receive a confirmation of the transaction.

Figure 9:
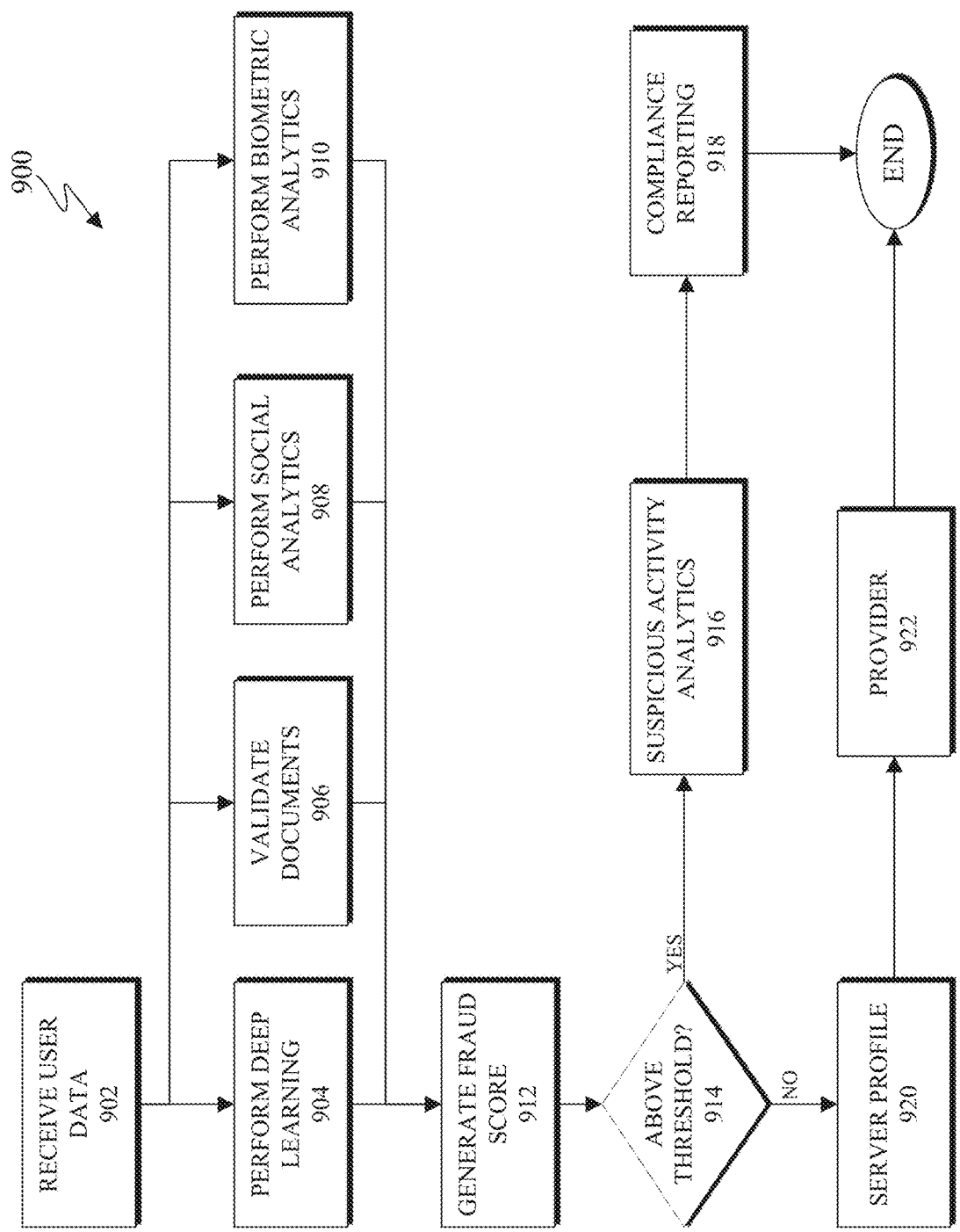
FIG. 9 illustrates an example method of registering a user and generating an initial fraud score, in accordance with an embodiment of this disclosure.

FIG. 9 illustrates an example method of registering a user and generating an initial fraud score, in accordance with an embodiment of this disclosure. While process 900 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the method registering a user is described with respect to the, environment 500A of FIG. 5A, and environment 600 of FIG. 6. However, the process 900 could be used with any other suitable system. In certain embodiments, process 900 illustrates the process of generating a fraud score by server 530 of FIG. 5A, remit server 540 of FIG. 5A, remit server 545 of FIG. 5B, or server 630 of FIG. 6 or a combination thereof. In certain embodiments, process 900 is performed during the initial registration process. Process 900 can also be implemented periodically to update the generated fraud score, to maintain an accurate analysis of the user. In certain embodiments process 900 is omitted, as fraud prevention can be executed by the remittance provider.

At block 902 remit server 540 receives user data. User data can include user credentials, user determined PIN, and passwords. User data can also include the user's biometric data such as fingerprint and iris scan. User data can include user identification documents such as driver's license, and other secondary forms of identification, as mandated by each respective country.

If the user is not registered with the remit agent 514 or remit server 540, the remit agent 514 can require additional information from the user such as the user's (i) name, (ii) address, (iii) mobile phone number, (iv) email address, (v) bank account information, and (vi) biometric information. In certain embodiments, remit agent 514 can also request permission to access one or more social media accounts.

Blocks 904 through 910 analyze the received user data and learned user traits to generate a fraud score at block 912. At block 904, remit server 540 performs deep learning that includes contextual analysis, predictive artificial intelligence queries based on analyzing the sender's capabilities and security credentials. Deep learning includes learning user's common traits and habits based on previous transaction and online presence.

At block 906, remit server 540 validates the received documents. For example, remit server 540 confirms the information on the user's driver's license matches the user. In certain embodiments, remit server 540 confirms the name of the sender matches the name associated with the user's profile. In certain embodiments, remit server 540 can utilize facial recognition processing to match the user's driver's license picture with a picture of the user obtained from a social media account of the user.

At block 908 remit server 540 performs social media analytics on the user. Social media analytics can include an analysis of the social behavior of the user. Social media analytics can also include uncovering a user's sentiment dispersed across countless online sources. Social media analytics can include three primary areas, data identification, data analysis, and information interpretation. For example, block 908 includes gathering, processing, and extracting valuable hidden insights from vast amounts of semi-structured and unstructured social media data to enable informed and insightful insights of the user, thereby allowing remit server 540 or a server to identify sentiments and trends of the user in order to better identify potential fraudulent activity. Fraudulent activity can include instances when the user's account is accessed by an unauthorized person or entity that desires the transfer the user's money without the user's consent. Social media analytics can include descriptive analytics, diagnostic analytics, predictive analytics, and prescriptive analytics.

At block 910 remit server 540 performs biometric analysis of the user. Remit server 540 can obtain scans of the user's fingerprints and irises in order to identify the user when the user initiates a transfer.

At block 912, remit server 540 generates a fraud score associated with the user based on the analysis of blocks 904 through 910. The generated fraud score is based on the learned user traits coupled with social behavioral contextual data of the user coupled with deep learning agents on sender's device 510 (of FIGS. 5A and 5B). The generated fraud score can include validating the biometric data of the user. The generated fraud score can also be utilized for compliance requirements to validate the user payment credentials and accept the profile to enable a user to remit or transfer money.

In certain embodiments, a fraud score can be generated by combining and weighing the elements of blocks 902 through 910. For example, the weight of the received user's data of block 902, can be combined with context derived from the deep learning of block 904, and factored with the square of the validating documents from block 906 for every instance, and then subsequently added along with the credit score and social ranking derived from block 908 and biometric analysis of block 910. The resulting factor can be indexed to arrive at an example embodiment of a fraud score.

At decision block 914 the remit server 540 determines whether the fraud score is above or below a threshold. If the fraud score is above the threshold then the user is a higher risk and blocks 916 through 918 are executed. If the fraud score is below the threshold then the user is a lower risk and blocks 920 through 922 are executed. The decision block 914 the threshold is reduces fraud and suspicious activity on the user's account.

When the user's fraud score is above the threshold then at block 916, suspicious activity analytics is performed. Suspicious activity analytics encompasses closely monitoring user's account to safeguard the account against possible fraudulent activity.

At block 918, remit server 540 forwards the data to in order to comply with compliance report requirements.

When the user's fraud score is below the threshold, then at block 920 the user's provide is migrated to the server to periodically update the fraud score. For example, blocks 902 through 910 can be repeated periodically to continually update the generated fraud score per block 912.

At block 922, the information is forward to the providers. The providers can use the information in determining fees for remittance transaction.

Figure 10:
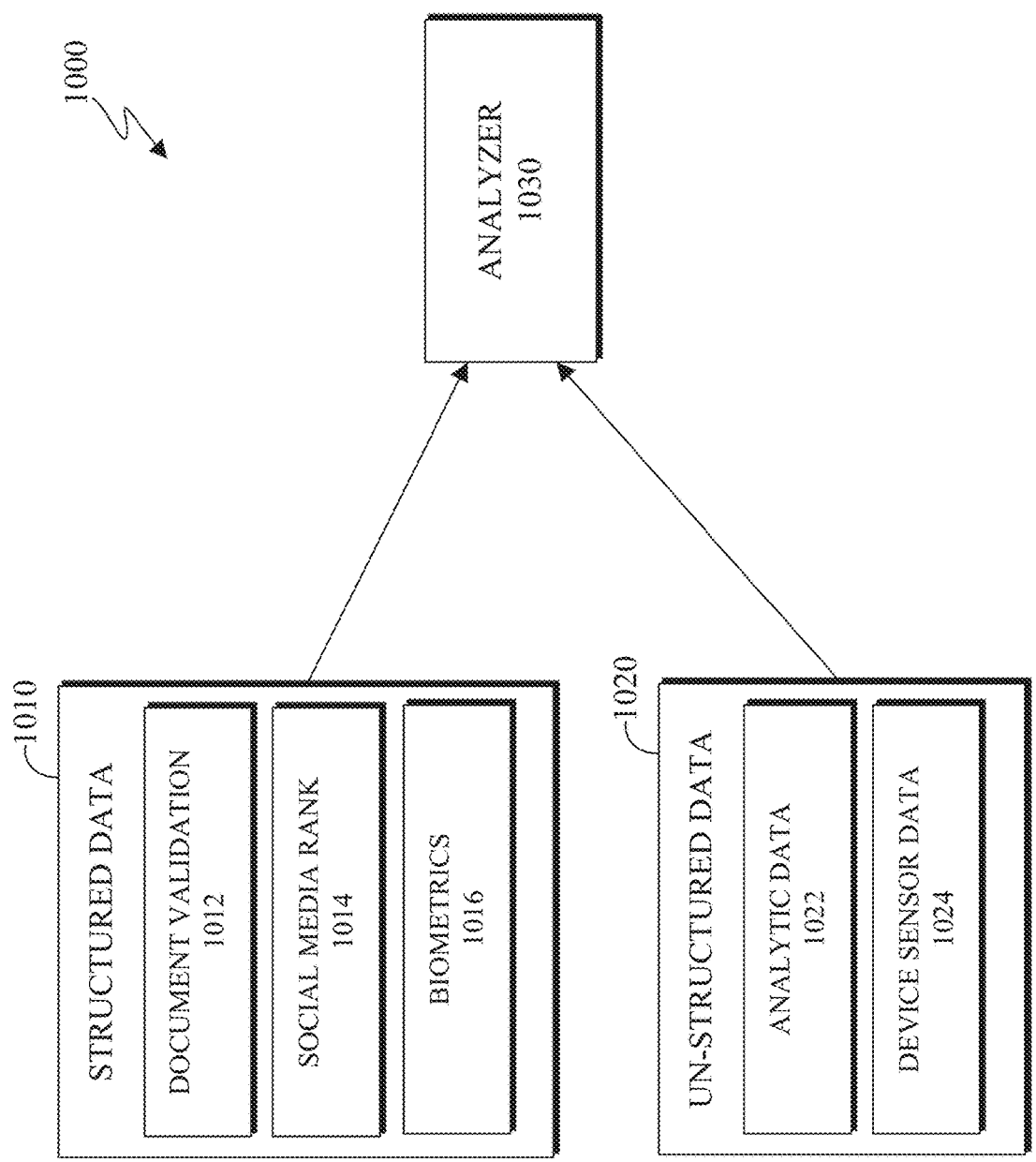
FIG. 10 illustrates an example block diagram of performing deep learning, in accordance with an embodiment of this disclosure.

FIG. 10 illustrates an example block diagram of performing deep learning, in accordance with an embodiment of this disclosure. In certain embodiments, server 530, of FIG. 5A (or remit server 545 of FIG. 5B, or server 630 of FIG. 6) performs deep learning using A. I. based on the sender's behavioral characteristics and historical data including, but not limited to, the sender's social media presence, contextual analysis of the sender, predictive artificial intelligence queries based on analyzing the sender's capabilities and security credentials. Specifically, FIG. 10 illustrates environment 1000 for assimilating ambiguous and incomplete information to generate a financial transaction ontology of the user profile and modeling the user's intent based on deep learning. The embodiment of the environment 1000 shown in FIG. 10 is for illustration only. Other embodiments could be used without departing from the scope of the present disclosure.

Environment 1000 illustrates a the compiling of data for deep learning in order to predict the intent of a user when conducting a transaction as well as to predict financial parameters for the transaction.

Structured data 1010 represents data with a high degree of organization, such information contained within a relational database that is seamless and readily searchable by simple, straightforward search engine algorithms or other search operations. Structured data 1010 includes time series data, user information, credit score, as well as document validation 1012 social rank 1014, biometrics 1016. Document validation 1012 is similar to validate documents of block 906 of FIG. 9. Social rank 1014 is similar to social analytics of block 908 of FIG. 9. Biometrics is similar to biometric analysis of block 910 of FIG. 9.

Un-structured data 1020 represents data that either does not have a pre-defined data model or is not organized in a pre-defined manner. Un-structured data 1020 includes analytical data 1022 and device sensors data 1024. The analytical data 1022 represents data that is derived from the device sensor data 1024, such as proximity 620, health analyzer 624, and 9-axis 629 of FIG. 6. For example, the analytic data 1022 can learn from the 9-axis motion detector 629 various movements of the user, such as the user's gait, how the user holds the electronic device, and the like.

Analyzer 1030 receives the structured data 1010 and the un-structured data 1020 to modeling the user's intent, based on deep learning. Analyzer 1030 models the user's intent. Analyzer 1030 can include a Bayesian analyzer to perform deep learning in order to generate the financial transaction ontology of the user profile and predict the intent of the user. A Bayesian analyzer is a statistical analysis that continually updates the output as additional data becomes available.

FIG. 11 illustrates an example block diagram of selecting a provider, in accordance with an embodiment of this disclosure. In certain embodiments, selecting a provider is performed by remit agent 514 of FIGS. 5A and 5B. In certain embodiments, selecting a provider is performed by server 530 of FIG. 5A, remit server 545 of FIG. 5B, or server 630 of FIG. 6. Environment 1100 illustrates analyzing both user data and provider data, to derive a provider. The embodiment of the environment 1100 shown in FIG. 11 is for illustration only. Other embodiments could be used without departing from the scope of the present disclosure.

User data 1110 and provider data 1120 represent validation sets. User data 1110 contains data of the sender and the receiver that is inputted into the analyzer 1130. User data can include sender preferences 1111 such as delivery times, repeat transactions, fee limits and the like. User data can also include the country the sender country is currently located in 1112. User data can also include receiver preferences such as delivery times, repeat transactions, fee limits and the like. User data can also include the country the receiver country is currently located in 1114. User data can also include deep learning data 1115. User data can also include preferred providers 1116 of the sender or the receiver or both. User data can also include the risk scores 1117 of the sender or the receiver or both. User data can also include historical data 1118 of the sender or the receiver or both, such as previously used providers. User data can also include the transfer amount 1119.

Provider data 1120 data contains data of the exchange rates 1122 and fees 1124 of each provider in the market place based on a variety of information including the location of the sender, the location of the receiver, the amount of money to transfer, the type of transfer, and the like.

Analyzer 1130 compiles the user data 1110 and the provider data 1120 to classify and perform a regression analysis to derive at an ideal provider. For example, analyzer 1130 can perform Support Vector Machine (SVM) analysis to derive the ideal provider. The ideal provider is the provider is weighted the highest based on the input of both the user data and the provider data. Each provider is mapped out on a graph as illustrated in environment architecture 1100. Line 1145 is the threshold and lines 1140 are the hyper parameters. Distance 1142 is the distance between the hyper parameters line 1140 and the threshold line 1145. Providers 1150, 1155A, 1155B, 1155C, and 1155D are providers that qualify to perform the transaction. Provider 1150 is categorized as the ideal provider as provider 1150 is closes to the threshold line 1145. If analyzer 1130 is instructed to select the ideal provider then provider 1150 is selected. Provider 1150 represents the provider that can perform the remittance between the sender and receivers location, and is the highest rated based the lowest fee coupled with satisfying any user data preferences.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method comprising:
   receiving, from an electronic device associated with a sender, a request, wherein the request includes a current geographic location obtained from a GPS sensor of the electronic device and transaction information that identifies a recipient;
   determining whether the current geographic location of the electronic device is within a pre-designated area;

generating an indication of fraud based on the determination;

transmitting the indication of fraud and the request to a plurality of providers;

receiving information associated with performance of the request from the plurality of providers;

identifying a portion of the plurality of providers based on a comparison of the received information from the plurality of providers and predefined criteria associated with both the sender and the recipient to a threshold;

transmitting, to the electronic device, a list of the portion of the plurality of providers; and notifying a provider to perform the request, when an indication is received that the provider is selected from the list.

2. The method of claim 1, further comprising:

negotiating remittance information with the plurality of providers based on the transaction information; and providing a suggested provider to perform the request, determined from the predefined criteria associated with the sender, the current geographic location of the electronic device, a location of the recipient, the negotiated remittance information, and the transaction information.

3. The method of claim 1, further comprising authenticating the sender that is associated with the request based on biometric information that is included in the request.

4. The method of claim 1, further comprising:

generating a fraud score associated with the sender; and transmitting the fraud score with the indication of fraud to the plurality of providers, wherein the fraud score is based on a contextual analysis, a deep learning analysis, and a social media analysis.

5. The method of claim 4, further comprising:

denying the request when the fraud score is above another threshold; and authenticating the request when the fraud score is below the other threshold.

6. The method of claim 2, wherein:

the plurality of providers is within a market of providers; and the request further includes an amount of money to remit to the recipient and a requested delivery speed, and negotiating the remittance information with the plurality of providers, further comprises receiving from the plurality of providers, a fee associated with the request, an exchange rate associated with the request, and available delivery speeds.

7. The method of claim 1, further comprising:

performing a deep learning on the sender to identify a potential for fraudulent activity, wherein the deep learning comprises:

analyzing behavior data of the sender, historical data of the sender, social media data of the sender, and contextual data of the sender;

responsive to analyzing the behavior data, the historical data, the social media data, and the contextual data of the sender, generating a financial transaction ontology of the sender to predict a set of financial parameters associated with the request; and identifying one or more activities of the sender that deviates from the predicted set of financial parameters.

8. The method of claim 1, further comprising:

predicting a future request, wherein the prediction includes another recipient, an amount of money, and a date of the future request, and wherein the prediction is based on structured and unstructured data.

9. An electronic device comprising:

a communication interface;

a memory; and at least one processor coupled to the communication interface and the memory, the at least one processor is configured to:

receive, from a second electronic device that is associated with a sender, a request, wherein the request includes a current geographic location obtained from a GPS sensor of the second electronic device and transaction information that identifies a recipient;

determine whether the current geographic location of the electronic device is within a pre-designated area;

generate an indication of fraud based on the determination;

transmit the indication of fraud and the request to a plurality of providers;

receive information associated with performance of the request from the plurality of providers;

identify a portion of the plurality of providers based on a comparison of the received information from the plurality of providers and predefined criteria associated with both the sender and the recipient to a threshold;

transmitting, to the second electronic device, a list of the portion of the plurality of providers; and notify a provider to perform the request, when an indication is received that the provider is selected from the list.

10. The electronic device of claim 9, wherein the at least one processor is further configured to:

negotiate remittance information with the plurality of providers based on the transaction information; and provide a suggested provider to perform the request, determined from the predefined criteria associated with the sender, the current geographic location of the second electronic device, a location of the recipient, the negotiated remittance information, and the transaction information.

11. The electronic device of claim 9, wherein the at least one processor is further configured to authenticate the sender that is associated with the request based on biometric information that is included in the request.

12. The electronic device of claim 9, wherein the at least one processor is further configured to:

generate a fraud score associated with the sender; and transmit the fraud score with the indication of fraud to the plurality of providers, wherein the fraud score is based on a contextual analysis, a deep learning analysis, and a social media analysis.

13. The electronic device of claim 10, wherein:

the plurality of providers is within a market of providers; and the request further includes an amount of money to remit to the recipient, and a requested delivery speed, and to negotiate the remittance information with the plurality of providers, the at least one processor is further configured to receive from the plurality of providers, a fee associated with the request, an exchange rate associated with the request, and available delivery speeds.

14. The electronic device of claim 9, wherein the at least one processor is further configured to:

perform a deep learning on the sender to identify a potential for fraudulent activity, wherein to perform the deep learning the at least one processor is further configured to:
  analyze behavior data of the sender, historical data of the sender, social media data of the sender, and contextual data of the sender;
  responsive to analyzing the behavior data, the historical data, the social media data, and the contextual data of the sender, generate a financial transaction ontology of the sender to predict a set of financial parameters associated with the request; and
  identify one or more activities of the sender that deviates from the predicted set of financial parameters.

15. The electronic device of claim 9, wherein the at least one processor is further configured to:
  predict a future request, wherein the prediction includes another recipient, an amount of money, and a date of the future request, and
  wherein the prediction is based on structured and unstructured data.

16. A non-transitory computer readable medium embodying a computer program, the computer program comprising program code that when executed by at least one processor of an electronic device causes the at least one processor to:
  receive, from a second electronic device that is associated with a sender, a request, wherein the request includes a current geographic location obtained from a GPS sensor of the second electronic device and transaction information that identifies a recipient;
  determine whether the current geographic location of the electronic device is within a pre-designated area;
  generate an indication of fraud based on the determination;
  transmit the indication of fraud and the request to a plurality of providers;
  receive information associated with performance of the request from the plurality of providers;
  identify a portion of the plurality of providers based on a comparison of the received information associated from the plurality of providers and predefined criteria associated with both the sender and the recipient to a threshold;
  transmitting, to the second electronic device, a list of the portion of the plurality of providers; and
  notify a provider to perform the request, when an indication is received that the provider is selected from the list.

17. The non-transitory computer readable medium of claim 16, further comprising program code that when executed by the at least one processor of the electronic device, causes the at least one processor to:
  negotiate remittance information with the plurality of providers based on the transaction information; and
  provide a suggested provider to perform the request, determined from the predefined criteria associated with the sender, the current geographic location of the second electronic device, a location of the recipient, the negotiated remittance information, and the transaction information.

18. The non-transitory computer readable medium of claim 16, further comprising program code that, when executed by the at least one processor of the electronic device, causes the at least one processor to authenticate the sender that is associated with the request based on biometric information that is included in the request.

19. The non-transitory computer readable medium of claim 16, further comprising program code that when executed by the at least one processor of the electronic device, causes the at least one processor to:
  generate a fraud score associated with the sender; and
  transmit the fraud score with the indication of fraud to the plurality of providers,
  wherein the fraud score is based on a contextual analysis, a deep learning analysis, and a social media analysis.

20. The non-transitory computer readable medium of claim 16, further comprising program code that when executed by the at least one processor of the electronic device, causes the at least one processor to:
  perform a deep learning on the sender to identify a potential for fraudulent activity, wherein to perform the deep learning the program code that when executed by the at least one processor causes, the at least one processor to:
    analyze behavior data of the sender, historical data of the sender, social media data of the sender, and contextual data of the sender;
    responsive to analyzing the behavior data, the historical data, the social media data, and the contextual data of the sender, generate a financial transaction ontology of the sender to predict a set of financial parameters associated with the request; and
  identify one or more activities of the sender that deviates from the predicted set of financial parameters.

* * * * *